United States Patent
Calixte et al.

(10) Patent No.: US 12,061,382 B2
(45) Date of Patent: Aug. 13, 2024

(54) PROGRESSIVE OPHTHALMIC LENS

(71) Applicant: Essilor International, Charenton-le-pont (FR)

(72) Inventors: Laurent Calixte, Charenton-le-pont (FR); Sébastien Fricker, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 634 days.

(21) Appl. No.: 17/291,362

(22) PCT Filed: Dec. 19, 2019

(86) PCT No.: PCT/EP2019/086346
§ 371 (c)(1),
(2) Date: May 5, 2021

(87) PCT Pub. No.: WO2020/127763
PCT Pub. Date: Jun. 25, 2020

(65) Prior Publication Data
US 2022/0004027 A1    Jan. 6, 2022

(30) Foreign Application Priority Data

Dec. 21, 2018   (EP) .................................... 18306787

(51) Int. Cl.
*G02C 7/06*    (2006.01)
*G02C 7/02*    (2006.01)

(52) U.S. Cl.
CPC ............. *G02C 7/066* (2013.01); *G02C 7/028* (2013.01)

(58) Field of Classification Search
CPC ................................ G02C 7/066; G02C 7/028
(Continued)

(56) References Cited

U.S. PATENT DOCUMENTS

| 5,719,658 A | 2/1998 | Ahsbahs et al. |
| 5,861,935 A | 1/1999 | Morris et al. |

(Continued)

FOREIGN PATENT DOCUMENTS

| CN | 103748505 A | 4/2014 |
| CN | 104995549 A | 10/2015 |

(Continued)

OTHER PUBLICATIONS

International Search Report and Written Opinion issued on Mar. 10, 2020 in PCT/EP2019/086346 filed on Dec. 19, 2019.

(Continued)

*Primary Examiner* — Joseph P Martinez
*Assistant Examiner* — Grant A Gagnon
(74) *Attorney, Agent, or Firm* — Oblon, McClelland, Maier & Neustadt, L.L.P.

(57) ABSTRACT

A progressive ophthalmic lens adapted to a wearer in given wearing conditions having an addition and fulfilling an acuity performance criterion determined by: defining a set of at least three different vision distances including at least a first vision distance greater than or equal to 4 m, a second vision distance greater than or equal to 0.6 m and smaller than or equal to 2 m and a third vision distance smaller than or equal to 0.5 m, each vision distance being associated with an acuity loss threshold value and an acuity area threshold value, providing an acuity model defining acuity loss as a function of lens power and resulting astigmatism, determining of each vision distance using the acuity model the area of gaze directions for which the acuity loss is below the associated acuity loss threshold value.

14 Claims, 23 Drawing Sheets

(58) Field of Classification Search
USPC .......................................................... 351/159
See application file for complete search history.

(56) References Cited

U.S. PATENT DOCUMENTS

| | | |
|---|---|---|
| 5,949,519 A | 9/1999 | Le Saux et al. |
| 6,074,062 A | 6/2000 | Morris et al. |
| 2013/0050637 A1 | 2/2013 | Roffman et al. |
| 2015/0355480 A1 | 12/2015 | Contet et al. |
| 2017/0108710 A1 | 4/2017 | Guilloux et al. |
| 2017/0108712 A1 | 4/2017 | Guilloux |
| 2018/0307059 A1 | 10/2018 | Rousseau et al. |
| 2018/0307060 A1 | 10/2018 | Rousseau et al. |

FOREIGN PATENT DOCUMENTS

| | | |
|---|---|---|
| FR | 2 733 328 A1 | 10/1996 |
| WO | WO 2015/173379 A1 | 11/2015 |
| WO | WO 2015/173381 A1 | 11/2015 |

OTHER PUBLICATIONS

Combined Chinese Office Action and Search Report issued Sep. 21, 2022 in Chinese Patent Application No. 201980075589.2 (with unedited computer generated English Translation), 18 pages.

PROGRESSIVE OPHTHALMIC LENS

TECHNICAL FIELD

The invention relates to a progressive ophthalmic lens adapted to a wearer in given wearing conditions having an addition greater than or equal to 1 D and smaller than or equal to 4 D, fulfilling an acuity performance criterion. The invention further relates to a method implemented by computer means for determining if a progressive ophthalmic lens fulfills an acuity criterion and a method implemented by computer means of determining a progressive ophthalmic lens.

The invention also relates to a computer program product comprising one or more stored sequence of instruction that is accessible to a processor.

BACKGROUND OF THE INVENTION

Usually, progressive ophthalmic lenses have a far distance vision region particularly adapted for far distance vision and a near distance vision region particularly adapted for near distance vision. The far distance vision region provides to the wearer a first refractive power and the near distance vision region provides to the wearer a second refractive power. The far and near distance vision regions are usually linked by a progressive region along which the refractive power progresses continuously.

Such progressive ophthalmic lenses are well adapted to provide a wearer a clear vision at near distance and far distance and the progressive region provides the wearer with a progressive refractive power so as to see at intermediate distances.

Although the progressive region may be used by the wearer to seek an intermediate distance, the visual comfort of the wearer may be reduced when using the progressive region of the progressive ophthalmic lens. In particular, the progressive region is usually narrow.

The use of intermediate distance vision increases, in particular since wearers spend more and more time reading on screens such as computer screens.

Existing ophthalmic lenses provide extended intermediate distance vision region. Usually such extension is done at the expense of the comfort of the wearer in far distance and near distance vision.

Therefore, there is a need for a progressive ophthalmic lens that would provide high degree of visual comfort to the wearer when seeking at far, near and intermediate distances. In particular, a progressive ophthalmic lens that would provide a balanced visual comfort for the wearer between the vision distances.

An aim of the present invention is to propose such a progressive ophthalmic lens.

SUMMARY OF THE INVENTION

To this end, the invention proposes a progressive ophthalmic lens adapted to a wearer in given wearing conditions having an addition greater than or equal to 1 D and smaller than or equal to 4 D, fulfilling an acuity performance criterion, wherein said acuity performance criterion being determined by:
defining a set of at least three different vision distances comprising at least a first vision distance greater than or equal to 4 m, a second vision distance greater than or equal to 0.6 m and smaller than or equal to 2 m, for example equal to 1 m and a third vision distance smaller than or equal to 0.5 m, each vision distance being associated with an acuity loss threshold value and an acuity area threshold value,
providing an acuity model defining acuity loss as a function of lens power and resulting astigmatism,
determining for each vision distance of the set of at least three vision distances the area of gaze directions for which the acuity loss is below the associated acuity loss threshold value, by using the acuity model
the acuity performance criterion being fulfilled if for each vision distance of the set of at least three vision distances, the area of gaze directions for which the acuity loss is below the associated acuity loss threshold value is greater than or equal to the acuity area threshold value corresponding to said distance with the acuity area threshold value being:
900 $deg^2$ for the first vision distance,
180 $deg^2$ for the third vision distance, and
max(−2440*ADD+5155; 20) $deg^2$ for the second distance vision.

The inventors have observed that an ophthalmic lens fulfilling the defined acuity performance criterion provides an increased optical comfort to the wearer, in particular a balanced optical comfort in terms of vision distance for the wearer when using the progressive ophthalmic lens.

Compared to prior art progressive ophthalmic lenses the visual comfort in intermediate vision in particular is significantly increased.

According to further embodiments which can be considered alone or in combination:
the acuity area threshold value is determined based on the addition of the progressive ophthalmic lens by interpolation between the values:

| Addition of the progressive addition lens (D) | Acuity area threshold for the first vision distance ($deg^2$) | Acuity area threshold for the second vision distance ($deg^2$) | Acuity area threshold for the third vision distance ($deg^2$) |
|---|---|---|---|
| 1 ≤ ADD ≤ 1.5 | 1200 | 1500 | 210 |
| ADD = 1.75 | 1150 | 900 | 170 |
| ADD = 2 | 1100 | 280 | 190 |
| ADD = 2.25 | 1200 | 60 | 190 |
| 2.5 ≤ ADD ≤ 4 | 900 | 25 | 180 | and/or
the acuity loss threshold value is the same for each vision distance of the set of at least three vision distances; and/or
the progressive ophthalmic lens has an addition greater than or equal to 1.5 D, for example greater than or equal to 2 D and smaller than or equal to 2.5 D; and/or
the progressive ophthalmic lens has an addition of 2 D; and/or
the first vision distance corresponds to 5 m; and/or
the second vision distance corresponds to 1 m; and/or the third vision distance corresponds to 0.4 m; and/or
the acuity area threshold value of the first vision distance is defined by interpolation between the values:

| Addition of the progressive addition lens (D) | Acuity area threshold for the first vision distance (deg$^2$) |
|---|---|
| 1 ≤ ADD ≤ 1.5 | 1500 |
| ADD = 1.75 | 1390 |
| ADD = 2 | 1200 |
| ADD = 2.25 | 1200 |
| 2.5 ≤ ADD ≤ 4 | 1120 | and/or
the acuity area threshold value of the second vision distance defined by interpolation between the values:

| Addition of the progressive addition lens (D) | Acuity area threshold for the second vision distance (deg$^2$) |
|---|---|
| 1 ≤ ADD ≤ 1.5 | 2400 |
| ADD = 1.75 | 1750 |
| ADD = 2 | 450 |
| ADD = 2.25 | 65 |
| 2.5 ≤ ADD ≤ 4 | 28 | and/or
the acuity area threshold value of the third vision distance defined by interpolation between the values:

| Addition of the progressive addition lens (D) | Acuity area threshold for third vision distance (deg$^2$) |
|---|---|
| 1 ≤ ADD ≤ 1.5 | 230 |
| ADD = 1.75 | 215 |
| ADD = 2 | 200 |
| ADD = 2.25 | 190 |
| 2.5 ≤ ADD ≤ 4 | 180 | and/or
the set of at least three vision distances further comprises a vision distance at 2 m and the acuity area threshold value of the said vision distance is defined by interpolation between the values:

| Addition of the progressive addition lens (D) | Acuity area threshold for a vision distance at 2 m (deg$^2$) |
|---|---|
| 1 ≤ ADD ≤ 1.5 | 1400 |
| ADD = 1.75 | 1570 |
| ADD = 2 | 1490 |
| ADD = 2.25 | 1100 |
| 2.5 ≤ ADD ≤ 4 | 205 | and/or
the acuity area threshold value of the 2 m vision distance is defined by interpolation between the values:

| Addition of the progressive addition lens (D) | Acuity area threshold for a vision distance at 2 m (deg$^2$) |
|---|---|
| 1 ≤ ADD ≤ 1.5 | 1800 |
| ADD = 1.75 | 1640 |
| ADD = 2 | 1495 |
| ADD = 2.25 | 1340 |
| 2.5 ≤ ADD ≤ 4 | 265 | and/or
the set of at least three vision distances further comprises a vision distance at 60 cm and the acuity area threshold of the said vision distance being defined by interpolation between the values:

| Addition of the progressive addition lens (D) | Acuity area threshold for a vision distance at 60 cm (deg$^2$) |
|---|---|
| 1 ≤ ADD ≤ 1.5 | 480 |
| ADD = 1.75 | 400 |
| ADD = 2 | 115 |
| ADD = 2.25 | 65 |
| 2.5 ≤ ADD ≤ 4 | 25 | and/or
the acuity area threshold value of the 60 cm vision distance is defined by interpolation between the values:

| Addition of the progressive addition lens (D) | Acuity area threshold for a vision distance at 60 cm (deg$^2$) |
|---|---|
| 1 ≤ ADD ≤ 1.5 | 600 |
| ADD = 1.75 | 460 |
| ADD = 2 | 400 |
| ADD = 2.25 | 100 |
| 2.5 ≤ ADD ≤ 4 | 40 | the areas of the gaze directions for which the acuity loss is below the associated acuity loss threshold value is defined within a predefined domain of gaze directions defined as circle of radius 35 deg centered on α=5 deg and β=0 deg or defined as the contour of the intersection between a given spectacle frame contour and said above-mentioned predefined domain of gaze directions.

The invention also relates to a method implemented by computer means for determining if a progressive ophthalmic lens fulfills an acuity criterion, said progressive ophthalmic lens being delimited by a contour, adapted for a wearer with a given prescription and given wearing conditions and having an addition greater than or equal to 1D and smaller than or equal to 4D, the method comprising the steps of:

defining a set of at least three different vision distances comprising at least a first vision distance greater than or equal to 4 m, a second vision distance greater than or equal to 0.6 m and smaller than or equal to 2 m, for example equal to 1 m and a third vision distance smaller than or equal to 0.5 m, each vision distance being associated with an acuity loss threshold value and an acuity area threshold value, providing an acuity model defining acuity loss as a function of lens power and resulting astigmatism, determining of each vision distance using the acuity model the area of gaze directions for which the acuity loss is below the associated acuity loss threshold value, determining if the acuity criterion is fulfilled by determining if for each vision distance of the set of a least three vision distances the determined area of gaze directions for which the acuity loss is below the associated acuity loss threshold value is greater than or equal to the associated acuity area threshold value corresponding to said distance with the acuity area threshold value being:

900 deg² for the first vision distance,
180 deg2 for the third vision distance, and
max(−2440*ADD+5155; 20) deg² for the second distance vision.

Advantageously, the method of the invention may be used to determine if a progressive ophthalmic lens fulfills the acuity criterion prior to manufacturing such progressive ophthalmic lens. In particular, the method of the invention may be used during a design process to determine a progressive ophthalmic lens that may offer an increase optical comfort to the wearer.

According to further embodiments which can be considered alone or in combination:
the acuity area threshold value is defined based on the addition of the progressive ophthalmic lens by interpolation between the values:

| Addition of the progressive addition lens (D) | Acuity area threshold for the first vision distance (deg²) | Acuity area threshold for the second vision distance (deg²) | Acuity area threshold for the third vision distance (deg²) |
| --- | --- | --- | --- |
| 1 ≤ ADD ≤ 1.5 | 1200 | 1500 | 210 |
| ADD = 1.75 | 1150 | 900 | 170 |
| ADD = 2 | 1100 | 280 | 190 |
| ADD = 2.25 | 1200 | 60 | 190 |
| 2.5 ≤ ADD ≤ 4 | 900 | 25 | 180 | and/or
the acuity loss threshold value is the same for each vision distance of the set of at least three vision distances; and/or
the progressive ophthalmic lens has an addition greater than or equal to 1.5 D, for example greater than or equal to 2 D and smaller than or equal to 2.5 D; and/or
the progressive ophthalmic lens has an addition of 2 D; and/or
the first vision distance corresponds to 5 m; and/or
the second vision distance corresponds to 1 m; and/or
the third vision distance corresponds to 40 cm; and/or
the acuity area threshold value of the first vision distance is defined by interpolation between the values:

| Addition of the progressive addition lens (D) | Acuity area threshold for the first vision distance (deg²) |
| --- | --- |
| 1 ≤ ADD ≤ 1.5 | 1500 |
| ADD = 1.75 | 1390 |
| ADD = 2 | 1200 |
| ADD = 2.25 | 1200 |
| 2.5 ≤ ADD ≤ 4 | 1120 | and/or
the acuity area threshold value of the second vision distance defined by interpolation between the values:

| Addition of the progressive addition lens (D) | Acuity area threshold for the second vision distance (deg²) |
| --- | --- |
| 1 ≤ ADD ≤ 1.5 | 2400 |
| ADD = 1.75 | 1750 |
| ADD = 2 | 450 |
| ADD = 2.25 | 65 |
| 2.5 ≤ ADD ≤ 4 | 28 | and/or
the acuity area threshold value of the third vision distance defined by interpolation between the values:

| Addition of the progressive addition lens (D) | Acuity area threshold for third vision distance (deg²) |
| --- | --- |
| 1 ≤ ADD ≤ 1.5 | 230 |
| ADD = 1.75 | 215 |
| ADD = 2 | 200 |
| ADD = 2.25 | 190 |
| 2.5 ≤ ADD ≤ 4 | 180 | and/or
the set of at least three vision distances further comprises a vision distance at 2 m and the acuity area threshold value of the said vision distance is defined by interpolation between the values:

| Addition of the progressive addition lens (D) | Acuity area threshold for a vision distance at 2 m (deg²) |
| --- | --- |
| 1 ≤ ADD ≤ 1.5 | 1400 |
| ADD = 1.75 | 1570 |
| ADD = 2 | 1490 |
| ADD = 2.25 | 1100 |
| 2.5 ≤ ADD ≤ 4 | 205 | and/or
the acuity area threshold value of the 2 m vision distance is defined by interpolation between the values:

| Addition of the progressive addition lens (D) | Acuity area threshold for a vision distance at 2 m (deg²) |
| --- | --- |
| 1 ≤ ADD ≤ 1.5 | 1800 |
| ADD = 1.75 | 1640 |
| ADD = 2 | 1495 |
| ADD = 2.25 | 1340 |
| 2.5 ≤ ADD ≤ 4 | 265 | and/or
the set of at least three vision distances further comprises a vision distance at 60 cm and the acuity area threshold of the said vision distance being defined by interpolation between the values:

| Addition of the progressive addition lens (D) | Acuity area threshold for a vision distance at 60 cm (deg²) |
| --- | --- |
| 1 ≤ ADD ≤ 1.5 | 480 |
| ADD = 1.75 | 400 |
| ADD = 2 | 115 |

| Addition of the progressive addition lens (D) | Acuity area threshold for a vision distance at 60 cm (deg²) |
|---|---|
| ADD = 2.25 | 65 |
| 2.5 ≤ ADD ≤ 4 | 25 | and/or
the acuity area threshold value of the 60 cm vision distance is defined by interpolation between the values:

| Addition of the progressive addition lens (D) | Acuity area threshold for a vision distance at 60 cm (deg²) |
|---|---|
| 1 ≤ ADD ≤ 1.5 | 600 |
| ADD = 1.75 | 460 |
| ADD = 2 | 400 |
| ADD = 2.25 | 100 |
| 2.5 ≤ ADD ≤ 4 | 40 | and/or
the areas of the gaze directions for which the acuity loss is below the associated acuity loss threshold value is defined within a predefined domain of gaze directions defined as circle of radius 35 deg centered on α=5 deg and β=0 deg or defined as the contour of the intersection between a given spectacle frame contour and said above-mentioned predefined domain of gaze directions.

The invention also relates to a method implemented by computer means of determining a progressive ophthalmic lens delimited by a contour, adapted for a wearer with a given prescription and given wearing conditions, said method comprising a step of determining if the determined progressive ophthalmic lens fulfills an acuity criterion according to the method of the invention.

The invention further relates to a computer program product comprising one or more stored sequences of instructions that are accessible to a processor and which, when executed by the processor, causes the processor to carry out the steps of the methods according to the invention.

The invention also relates to a computer readable medium carrying out one or more sequences of instructions of the computer program product of the invention.

The invention further relates to a computer-readable storage medium having a program recorded thereon; where the program makes the computer execute the method of the invention.

The invention also relates to a device comprising a processor adapted to store one or more sequence of instructions and to carry out at least one of the steps of the method according to the invention.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

Definitions

The following definitions are provided so as to define the wordings used within the frame of the present invention.

The wordings "wearer's prescription", also called "prescription data", are known in the art. Prescription data refers to one or more data obtained for the wearer and indicating for at least an eye, preferably for each eye, a prescribed sphere $SPH_P$, and/or a prescribed astigmatism value $CYL_P$ and a prescribed axis $AXIS_P$ suitable for correcting the ametropia of each eye of the wearer and, if suitable, a prescribed addition $ADD_P$ suitable for correcting the presbyopia of each of his eyes at a given distance.

"Progressive ophthalmic lenses" are known in the art. They are corrective lenses that provide comfortable vision for a presbyopic wearer at all distances.

The wearer's prescription for progressive ophthalmic lens comprises prescribed sphere $SPH_P$, and/or a prescribed astigmatism value $CYL_P$ and a prescribed axis $AXIS_P$ suitable for correcting the ametropia of each eye of the wearer at far vision distance and, a prescribed addition $ADD_P$.

Advantageously for the purpose of the invention, the prescribed sphere is greater or equal to −20D and smaller or equal to 13D, preferably greater or equal to −6D and smaller or equal to 4D. Advantageously, the prescribed astigmatism value is greater or equal to −4D and smaller or equal to 0D, preferably greater or equal to −2D and smaller or equal to 0D.

The prescription for far vision distance is determined at a given vision distance corresponding to a given proximity $ProxFV_p$, in most cases $ProxFV_p=0$, and the prescription for near vision distance or the corresponding prescribed addition ADD is determined at a different vision distance corresponding to a given proximity $ProxNV_p$, in most cases $ProxNV_p=2.5$ D.

The term can also refer to said ophthalmic lenses which could present at least one added value such as, for example, tint, photochromism, polarization filtering, electrochromism, antireflective properties, antiscratch properties. The lens may be also a lens for information glasses, wherein the lens comprises means for displaying information in front of the eye . . . .

All progressive ophthalmic lenses of the invention may be paired so as to form a pair of progressive ophthalmic lenses (left eye LE, right eye RE).

A "gaze direction" is identified by a couple of angle values (α,β), wherein said angles values are measured with regard to reference axes centered on the center of rotation of the eye, commonly named as "CRE". More precisely, FIG.

Figure 2:
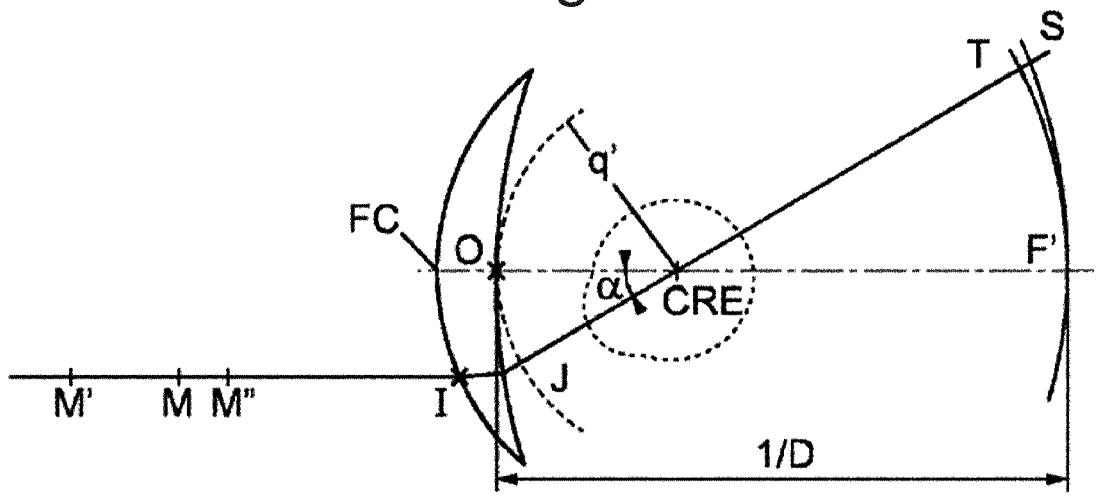

1 represents a perspective view of such a system illustrating parameters α and β used to define a gaze direction. FIG. 2 is a view in the vertical plane parallel to the antero-posterior axis of the wearer's head and passing through the center of rotation of the eye in the case when the parameter β is equal to 0. The center of rotation of the eye is labeled CRE. The axis CRE-F', shown on FIG. 2 in a dot-dash line, is the horizontal axis passing through the center of rotation of the eye and extending in front of the wearer—that is the axis CRE-F corresponding to the primary gaze direction. The lens is placed and centered in front of the eye such that the axis CRE-F cuts the front surface of the lens on a point called the fitting cross, which is, in general, present on lenses to enable the positioning of lenses in a frame by an optician. The point of intersection of the rear surface of the lens and the axis CRE-F is the point, O. A vertex sphere, which center is the center of rotation of the eye, CRE, and has a radius q'=O-CRE, intercepts the rear surface of the lens in a point of the horizontal axis.

A value of radius q' of 25.5 mm corresponds to a usual value and provides satisfying results when wearing the lenses. Other value of radius q' may be chosen. A given gaze direction, represented by a solid line on FIG. 1, corresponds to a position of the eye in rotation around CRE and to a point J (see FIG. 2) of the vertex sphere; the angle β is the angle formed between the axis CRE-F and the projection of the straight line CRE-J on the horizontal plane comprising the axis CRE-F; this angle appears on the scheme on FIG. 1.

Figure 1:
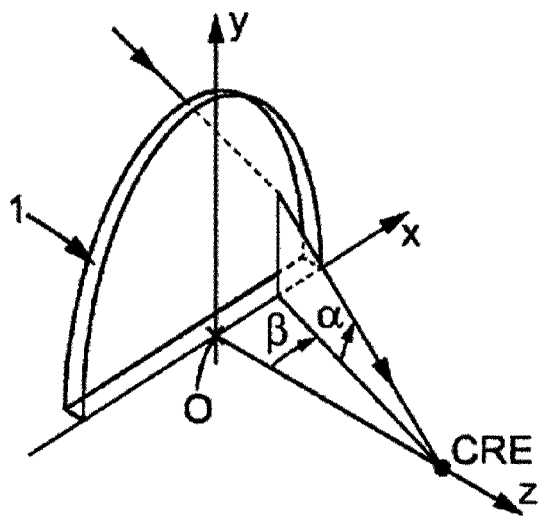
FIGS. 1 and 2 show, diagrammatically, optical systems of eye and lens and ray tracing from the center of rotation of the eye when considering monocular vision.

The angle α is the angle formed between the axis CRE-J and the projection of the straight line CRE-J on the horizontal plane comprising the axis CRE-F; this angle appears on the scheme on FIGS. 1 and 2. A given gaze view thus corresponds to a point J of the vertex sphere or to a couple (α,β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F.

The distance D corresponds to the rear frontal plane of the lens. I is the point of the ray that intercepts the front face (opposite to the eye) of the lens on the path to the image of the point M in the object space. Further images of points M' and M" in the object space can be considered, located at different object distances.

For each gaze direction (α,β), a mean refractive power PPO(α,β), a module of astigmatism AST(α,β) and an axis AXE(α,β) of this astigmatism, and a module of resulting (also called residual or unwanted) astigmatism ASR(α,β) are defined.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis.

"Ergorama" is a function associating to each gaze direction a distance of an object point.

Usual ergorama may be defined so that in far vision following the primary gaze direction, the object point is at infinity. In near vision, following a gaze direction essentially corresponding to an angle α of the order of 35 deg and to an angle β of the order of 5 deg in absolute value towards the nasal side, the object distance is of the order of 30 to 50 cm.

For more details concerning a possible definition of an ergorama, U.S. Pat. No. 6,318,859 may be considered. This document describes an ergorama, its definition and its modeling method.

Using these elements, it is possible to define a wearer optical power and astigmatism, in each gaze direction. An object point M at an object distance given by the ergorama is considered for a gaze direction (α,β).

An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power PPO as the sum of the image proximity and the object proximity.

$$PPO = ProxO + ProxI$$

The optical power is also called refractive power.

With the same notations, an astigmatism AST is defined for every gaze direction and for a given object proximity as:

$$AST = \left|\frac{1}{JT} - \frac{1}{JS}\right|$$

The resulting astigmatism ASR is defined for every gaze direction through the lens as the difference between the actual astigmatism value AST for this gaze direction and the prescribed astigmatism for the same lens. The residual astigmatism (resulting astigmatism) ASR more precisely corresponds to module of the vectorial difference between actual (AST, AXE) and prescription data (CYLp, AXISp).

When the characterization of the lens is of optical kind, it refers to the ergorama-eye-lens system described above. For simplicity, the term lens' is used in the description but it has to be understood as the 'ergorama-eye-lens system'. The values in optic terms can be expressed for gaze directions. Conditions suitable to determine of the ergorama-eye-lens system are called in the frame present invention "as-worn conditions".

In the remainder of the description, terms like «up», «bottom», «horizontal», «vertical», «above», «below», or other words indicating relative position may be used. These terms are to be understood in the wearing conditions of the lens.

Notably, the "upper" part of the lens corresponds to a negative lowering angle α<0 deg and the "lower" part of the lens corresponds to a positive lowering angle α>0 deg.

A "far-vision gaze direction", referred as FVGD, is defined for a lens, as the vision gaze direction corresponding to the far vision distant reference point and thus $(\alpha_{FV}, \beta_{FV})$, where the mean refractive power is substantially equal to the mean prescribed power in far vision, the mean prescribed power being equal to SPHp+(CYLp/2). Within the present disclosure, far-vision is also referred to as distant-vision.

A "near-vision gaze direction", referred as NVGD, is defined for a lens, as the vision gaze direction corresponding to the near vision (reading) reference point, and thus $(\alpha_{NV}, \beta_{NV})$ where the refractive power is substantially equal to the prescribed power in far vision plus the prescribed addition, $ADD_P$.

A "fitting-cross gaze direction", referred as FCGD, is defined for a lens, as the vision gaze direction corresponding to the fitting cross reference point and thus $(\alpha_{FC}, \beta_{FC})$.

The "meridian line", referred as $ML(\alpha,\beta)$, of a progressive lens is a line defined from top to bottom of the lens and usually passing through the fitting cross where one can see clearly an object point. Said meridian line is defined on the basis of the repartition of module of resulting astigmatism, ASR, over the $(\alpha,\beta)$ domain and substantially correspond to the center of the two central iso-module of resulting astigmatism values which value is equal to 0.25 Diopter.

A "mean refractive power error", referred as PE_P, is defined as the mean refractive power difference between the actual addition brought by the lens and the proximity, at a given point of the object space $(\alpha,\beta,ProxO)$, according to following equation:

$$PE\_P(\alpha,\beta,ProxO)=PPO(\alpha,\beta,ProxO)-(PPO(FV)-ProxFV_p)-ProxO$$

where PPO(FV) is the mean refractive power of the prescription of the wearer according to the far-vision gaze direction, for an object located at a distance corresponding to $ProxFV_p$.

A "relative acuity", referred as AC %_P, is defined as the result of a function of the mean refractive power error, PE_P, and of the resulting astigmatism, ASR, according to an acuity model, at a given point of the object space $(\alpha, \beta, ProxO)$; an example of an embodiment of calculation of relative acuity is provided here below.

An "acuity loss", referred as ACU_P, is defined as a function of the relative acuity at a given point of the object space $(\alpha, \beta, ProxO)$, according to following equation:

$$ACU\_P(\alpha,\beta,ProxO)=-\log(AC\%\_P(\alpha,\beta,ProxO)/100)$$

where "log" is the logarithm in base 10.

Figure 3:
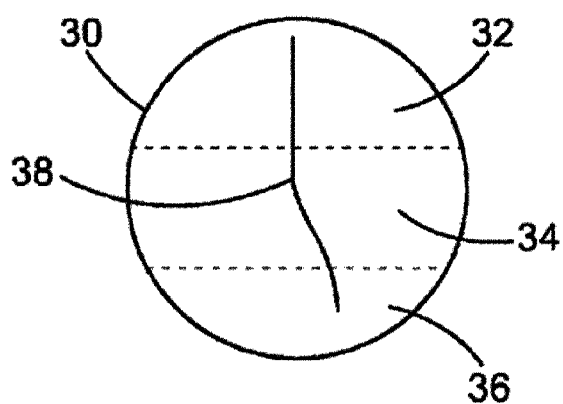
FIG. 3 shows field vision zones of progressive ophthalmic lens.

FIG. 3 shows field vision zones of an ophthalmic progressive addition lens 30 where said lens comprises a far vision (distant vision) zone 32 located in the upper part of the lens, a near vision zone 36 located in the lower part of the lens and an intermediate zone 34 situated between the far vision zone 32 and the near vision zone 36. The meridian line is referred as 38.

DETAILED DESCRIPTION OF EMBODIMENTS OF THE INVENTION

The invention relates to a progressive ophthalmic lens adapted to a wearer in given wearing conditions having an addition greater than or equal to 1 D and smaller than or equal to 4 D, fulfilling an acuity performance criterion.

The progressive ophthalmic lens may be defined by its geometry, in particular the shape of the front and rear surfaces, their relative position and the refractive index of the material of the progressive ophthalmic lens.

The progressive ophthalmic lens being adapted to a wearer, the wearer's prescription is to be considered to define said progressive ophthalmic lens.

The wearing conditions are to be understood as the position of the progressive ophthalmic lens with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8 deg.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position, for example equal to 5 deg.

The wearing condition may be customized for a given wearer or may be standard wearing conditions.

An example of standard wearing condition may be defined by a pantoscopic angle of −8 deg, a Cornea to lens distance of 12 mm, a Pupil-cornea distance of 2 mm, a CRE to pupil distance of 11.5 mm, a CRE to lens distance of 25.5 mm and a wrap angle of 5 deg.

The progressive ophthalmic lens according to the invention may have an addition greater than or equal to 1.5 D, for example greater than or equal to 2 D, and smaller than or equal to 2.5 D.

According to an embodiment of the invention, the progressive addition lens may have an addition of 2D.

The progressive ophthalmic lens according to the invention fulfills an acuity performance criterion.

Figure 4:
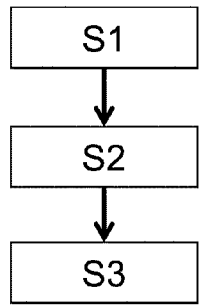
FIG. 4 is a flowchart of a method according to the invention.

The acuity performance criterion is determined by method of the invention comprising as illustrated on FIG. 4:
  a set of distances defining step S1,
  an acuity model providing step S2,
  an area determining step S3.

During the set of distances defining step S1, a set of vision distances comprising at least three different vision distances: at least a first vision distance greater than or equal to 4 m, a second vision distance greater than or equal to 0.6 m and smaller than or equal to 2 m, for example equal to 1 m and a third vision distance smaller than or equal to 0.5 m.

The set of vision distances may comprise further vision distances, for example a vision distance at 2 m and/or a vision distance at 0.6 m.

Each vision distance of the set of vision distances is associated with an acuity loss threshold value.

The acuity loss threshold value corresponds to the maximum value of acuity loss acceptable for a given distance.

According to a preferred embodiment of the invention, the acuity loss threshold value is identical for each distance of the set of vision distances.

Typically, the acuity loss threshold value may correspond to a visual acuity of 0.63 if the best visual acuity was 1.

During the acuity model providing step S2, an acuity model is provided. The acuity model defines acuity loss as a function of lens power and resulting astigmatism.

For each vision distance of the set of vision distances, one needs to determine the acuity loss within a predetermined domain of gaze directions.

The predefined domain of gaze directions may be defined as circle of radius 35 deg centered on $\alpha=5$ deg and $\beta=0$ deg. The predefined domain may be defined by a given frame contour, for example, the predefined domain may be defined as the contour of the intersection between a given spectacle frame contour and said above-mentioned predefined domain of gaze directions.

Preferably the predetermined domain of gaze directions is the same for each vision distance of the set of vision distances.

For each vision distance, the predetermined domain of gaze directions may be spatially sampled, for example with a step of 1 deg in ($\alpha$, $\beta$), the result being a mesh of gaze directions ($\alpha_{i,k}$, $\beta_{i,l}$).

Preferably the sampling is identical for each vision distance of the set of vision distances.

For each gaze direction within the mesh of gaze directions one may trace the ray originating from the CRE in the given direction.

According to the previously indicated definition, one determines for each vision distance of the set of vision distances or the corresponding proximity ProxO and for each gaze direction ($\alpha$, $\beta$) of the mesh of gaze direction, the following features:

PPO($\alpha,\beta$,ProxO), which is the mean refractive power for a gaze direction ($\alpha$, $\beta$) and a proximity ProxO;

ASR($\alpha$, $\beta$, ProxO), which is the residual astigmatism for a gaze direction ($\alpha$, $\beta$) and a proximity ProxO;

PE_P($\alpha,\beta$, ProxO), which is the mean refractive power error for a gaze direction ($\alpha,\beta$) at a given proximity, ProxO, and is determined according to following equation:

$PE\_P(\alpha,\beta,ProxO)=PPO(\alpha,\beta,ProxO)-(PPO(FV)-ProxFV_p)-ProxO;$

OA_P(ADD$_p$), which is the objective accommodation of the wearer and is determined as the result of a function of its prescribed addition, ADD$_p$, according to to the following equation:

$OA\_P(ADD_p)=max(ProxNV_p-ProxFV_p-ADD_p,0)$

RPE_P($\alpha$, $\beta$, ProxO), which is the residual power error for a gaze direction ($\alpha,\beta$) at a given proximity, ProxO, and is determined according to following equation:

$RPE\_P(\alpha,\beta,ProxO)=max((-PE\_P(\alpha,\beta,ProxO)-OA\_P(ADD_p)),0),$ if PE_P($\alpha$, $\beta$, ProxO)<0; and $RPE\_P(\alpha,\beta,ProxO)=PE\_P(\alpha,\beta,ProxO)$, if PE_P($\alpha,\beta$, ProxO)≥0 the said residual power error is defined so as to take into account the accommodation ability of the wearer; actually, if PE_P($\alpha,\beta$, ProxO)<0, the wearer can accommodate to compensate the residual power error, but limited to his objective accommodation; if PE_P($\alpha,\beta$, ProxO)≥0, the wearer cannot accommodate to compensate the residual power error.

RAE_P($\alpha,\beta$, ProxO), which is the residual astigmatism error for a gaze direction ($\alpha,\beta$) at a given proximity, ProxO, and is equal to ASR($\alpha,\beta$, ProxO) for all proximities of a same gaze direction ($\alpha,\beta$) because the wearer cannot compensate the residual astigmatism of the lens.

AC %_P($\alpha,\beta$,ProxO), which is the relative acuity for a gaze direction ($\alpha,\beta$) at a given proximity, ProxO, and is determined according to following equation:

$AC\%\_P(\alpha,\beta,ProxO)=max(100-63*RPE\_P(\alpha,\beta,ProxO)-44.3*RAE\_P(\alpha,\beta,ProxO)+7.2*RPE\_P(\alpha,\beta,ProxO)^2+19.5*RPE\_P(\alpha,\beta,ProxO)*RAE\_P(\alpha,\beta,ProxO)+RAE\_P(\alpha,\beta,ProxO)^2;1)$ ACU_P($\alpha,\beta$, ProxO)=–Log(AC %_P/100), which is acuity loss for a gaze direction ($\alpha,\beta$) at a given proximity, ProxO, and is determined according to following equation: ACU_P($\alpha,\beta$,ProxO)=–log(AC %_P($\alpha$, $\beta$, ProxO)/100), when considering the wearer's maximal acuity as being equal to 10/10, and ACU_P($\alpha,\beta$, ProxO) is expressed in logMAR.

During the area determining step, for each vision distance of the set of visions distances an area of gaze directions (expressed in deg$^2$) for which the acuity loss is below the associated acuity loss threshold value, for example 0.15 LogMAR, is determined.

The acuity performance criterion is fulfilled if for each vision distance of the set of at least three vision distances, the area of gaze directions determined during the area determining step is greater than or equal to the acuity area threshold value corresponding to said distance.

Each vision distance may have a different acuity area threshold value defined in term of area of gaze directions.

For example, the acuity area threshold values may be:
for the first vision distance: 900 deg$^2$,
for the third vision distance: 180 deg$^2$, and
for the second vision distance: max(-2440*ADD+5155, 20) with ADD the addition of the progressive ophthalmic lens.

According to a preferred embodiment, the acuity area threshold value for each vision distance is determined based on the addition of the progressive ophthalmic lens by interpolation between the values:

| Addition of the progressive addition lens (D) | Acuity area threshold for the first vision distance (deg$^2$) | Acuity area threshold for the second vision distance (deg$^2$) | Acuity area threshold for the third vision distance (deg$^2$) |
|---|---|---|---|
| 1 ≤ ADD ≤ 1.5 | 1200 | 1500 | 210 |
| ADD = 1.75 | 1150 | 900 | 170 |
| ADD = 2 | 1100 | 280 | 190 |

-continued

| Addition of the progressive addition lens (D) | Acuity area threshold for the first vision distance (deg²) | Acuity area threshold for the second vision distance (deg²) | Acuity area threshold for the third vision distance (deg²) |
|---|---|---|---|
| ADD = 2.25 | 1200 | 60 | 190 |
| 2.5 ≤ ADD ≤ 4 | 900 | 25 | 180 |

According to an embodiment of the invention, the acuity area threshold value of the first vision distance may be defined by interpolation between the values:

| Addition of the progressive addition lens (D) | Acuity area threshold for the first vision distance (deg²) |
|---|---|
| 1 ≤ ADD ≤ 1.5 | 1500 |
| ADD = 1.75 | 1390 |
| ADD = 2 | 1200 |
| ADD = 2.25 | 1200 |
| 2.5 ≤ ADD ≤ 4 | 1120 |

According to an embodiment of the invention, the acuity area threshold value of the second vision distance defined by interpolation between the values:

| Addition of the progressive addition lens (D) | Acuity area threshold for the second vision distance (deg²) |
|---|---|
| 1 ≤ ADD ≤ 1.5 | 2400 |
| ADD = 1.75 | 1750 |
| ADD = 2 | 450 |
| ADD = 2.25 | 65 |
| 2.5 ≤ ADD ≤ 4 | 28 |

According to an embodiment of the invention, the acuity area threshold value of the third vision distance defined by interpolation between the values:

| Addition of the progressive addition lens (D) | Acuity area threshold for the third vision distance (deg²) |
|---|---|
| 1 ≤ ADD ≤ 1.5 | 230 |
| ADD = 1.75 | 215 |
| ADD = 2 | 200 |
| ADD = 2.25 | 190 |
| 2.5 ≤ ADD ≤ 4 | 180 |

According to an embodiment of the invention, the set of vision distances further comprises a vision distance at 2 m and the acuity area threshold value of the said vision distance is defined by interpolation between the values:

| Addition of the progressive addition lens (D) | Acuity area threshold for a vision distance at 2 m (deg²) |
|---|---|
| 1 ≤ ADD ≤ 1.5 | 1400 |
| ADD = 1.75 | 1570 |
| ADD = 2 | 1490 |
| ADD = 2.25 | 1100 |
| 2.5 ≤ ADD ≤ 4 | 205 |

According to an embodiment of the invention, the acuity area threshold value of the 2 m vision distance is defined by interpolation between the values:

| Addition of the progressive addition lens (D) | Acuity area threshold for a vision distance at 2 m (deg²) |
|---|---|
| 1 ≤ ADD ≤ 1.5 | 1800 |
| ADD = 1.75 | 1640 |
| ADD = 2 | 1495 |
| ADD = 2.25 | 1340 |
| 2.5 ≤ ADD ≤ 4 | 265 |

According to an embodiment of the invention, the set of vision distances further comprises a vision distance at 60 cm and the acuity area threshold of the said vision distance being defined by interpolation between the values:

| Addition of the progressive addition lens (D) | Acuity area threshold for a vision distance at 60 cm (deg²) |
|---|---|
| 1 ≤ ADD ≤ 1.5 | 480 |
| ADD = 1.75 | 400 |
| ADD = 2 | 115 |
| ADD = 2.25 | 65 |
| 2.5 ≤ ADD ≤ 4 | 25 |

According to an embodiment of the invention, the acuity area threshold value of the 60 cm vision distance is defined by interpolation between the values:

| Addition of the progressive addition lens (D) | Acuity area threshold for a vision distance at 60 cm (deg²) |
|---|---|
| 1 ≤ ADD ≤ 1.5 | 600 |
| ADD = 1.75 | 460 |
| ADD = 2 | 400 |
| ADD = 2.25 | 100 |
| 2.5 ≤ ADD ≤ 4 | 40 |

The invention further relates to a method, for example implemented by computer means, for determining if a progressive ophthalmic lens fulfills an acuity criterion, said progressive ophthalmic lens being delimited by a contour, adapted for a wearer with a given prescription and given wearing conditions and having an addition greater than or equal to 1D and smaller than or equal to 4D.

The method comprises the steps of:
defining a set of at least three different vision distances comprising at least first vision distance greater than or equal to 4 m, a second vision distance greater than or equal to 0.6 m and smaller than or equal to 2 m, for example equal to 1 m and a third vision distance smaller than or equal to 0.5 m, each vision distance being associated with an acuity loss threshold value and an acuity area threshold value,
providing an acuity model defining acuity loss as a function of lens power and resulting astigmatism,
determining of each vision distance using the acuity model the area of gaze directions for which the acuity loss is below the associated acuity loss threshold value, determining whether the acuity criterion is fulfilled by determining if for each vision distance of the set of a least three vision distances the determined area of gaze directions for which the acuity loss is below the associated acuity loss threshold value is greater than or equal to the associated acuity area threshold value corresponding to said distance with the acuity area threshold value being:

900 deg$^2$ for the first vision distance,
180 deg2 for the third vision distance, and
max(−2440*ADD+5155; 20) deg$^2$ for the second distance vision.

The acuity model and calculations implemented for the method of the invention are as described previously.

The invention further relates to a method, for example implemented by computer means, of determining a progressive ophthalmic lens delimited by a contour, adapted for a wearer with a given prescription and given wearing conditions, said method comprising a step of determining if the determined progressive ophthalmic lens fulfills an acuity criterion according to the method of the invention.

Determining a progressive ophthalmic lens according to said method may comprise selecting in a predefined list of progressive ophthalmic lens, a progressive ophthalmic lens delimited by a contour, adapted for a wearer with a given prescription and given wearing conditions that fulfills the acuity criterion.

Determining a progressive ophthalmic lens according to said method may comprise calculating a progressive ophthalmic lens delimited by a contour, adapted for a wearer with a given prescription and given wearing conditions so as to fulfill the acuity criterion.

Calculating a progressive ophthalmic lens typically comprises an optimization step implementing a plurality of targets, said targets comprising at least the prescription of the wearer and the acuity criterion.

The optimization step can be performed by using optimization algorithms.

These methods are known by the one skilled in the art, for example in the publication "Application of optimization in computer-aided ophthalmic lens design" (P. Allione, F. Ahsbahs and G. Le Saux, in SPI E Vol. 3737, EUROPTO Conference on Design and Engineering of Optical Systems, Berlin, May 1999), which is incorporated by reference in the present document.

Example

The inventors have compared a progressive ophthalmic lens according to the invention with a prior art progressive ophthalmic lens. Both progressive ophthalmic lenses fulfill following prescribed features:

prescribed sphere $SPH_P$=−4 D;
prescribed astigmatism value $CYL_P$=0 D;
prescribed axis $AXIS_P$=0 deg;
prescribed addition $ADD_P$=2 D;

Both progressive ophthalmic lenses have been determined over a contour that delimits the gaze direction field and said contour is defined as a circle of radius 35 deg centered on α=5 deg and β=0 deg.

Both progressive ophthalmic lenses are considered in the following wearing conditions:

the pantoscopic angle is −8 deg;
the wrap angle is 5 deg;
the distance between the CRE and the lens is 25.5 mm.

Calculations are performed in the monocular eye referential as here above explained when discussing FIG. 1.

Both progressive ophthalmic lenses have a thickness at the prism reference point as defined in ISO 89-80-22004, of 1.4 mm and a prism at the said prism reference point of ⅔ of the addition and oriented base down.

The progressive ophthalmic lens of the invention has a front base of 2.75 D at the far vision control point based on a reference refractive index of 1.53.

The progressive ophthalmic lens of the prior art has a front base of 3.75 D at the far vision control point based on a reference refractive index of 1.53.

Both progressive ophthalmic lenses have a refractive index of 1.665.

FIGS. 5a to 7f show features of the prior art progressive ophthalmic lens.

FIGS. 5a to 5f shows mean refractive power curve along the meridian. The x-axes are graduated in diopters, and the y-axes is the angle α in deg along the meridian of the said prior art ophthalmic lens.

Figure 5A:
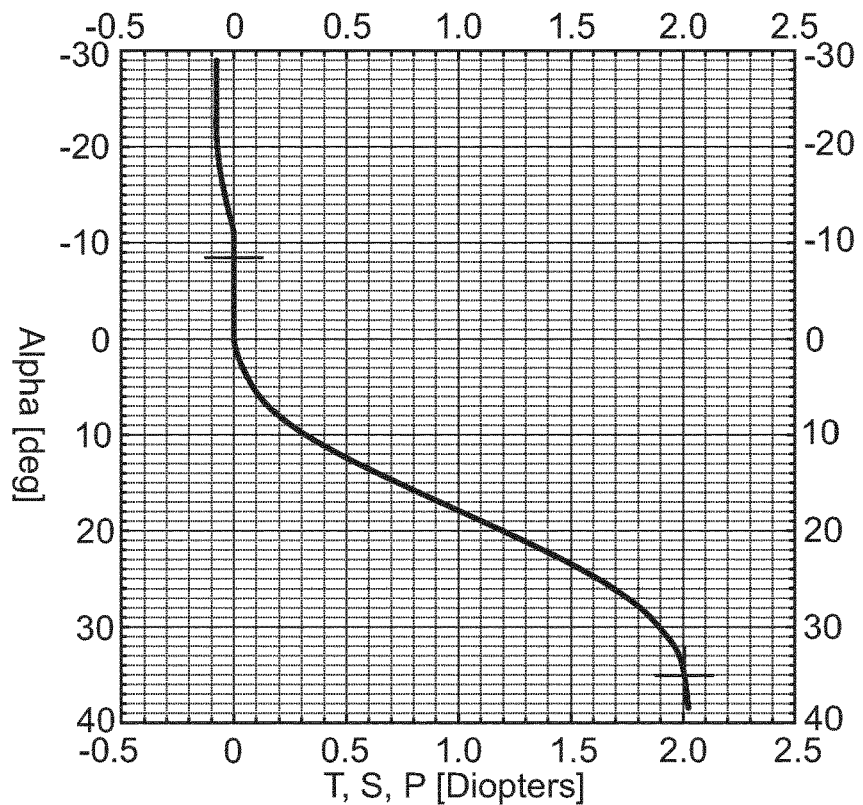
FIGS. 5a to 7f give optical characteristics of a progressive ophthalmic according to the prior art.

The mean refractive power curve on FIG. 5a has been calculated using a classic ergorama as disclosed in U.S. Pat. No. 6,318,859.

Figure 5B:
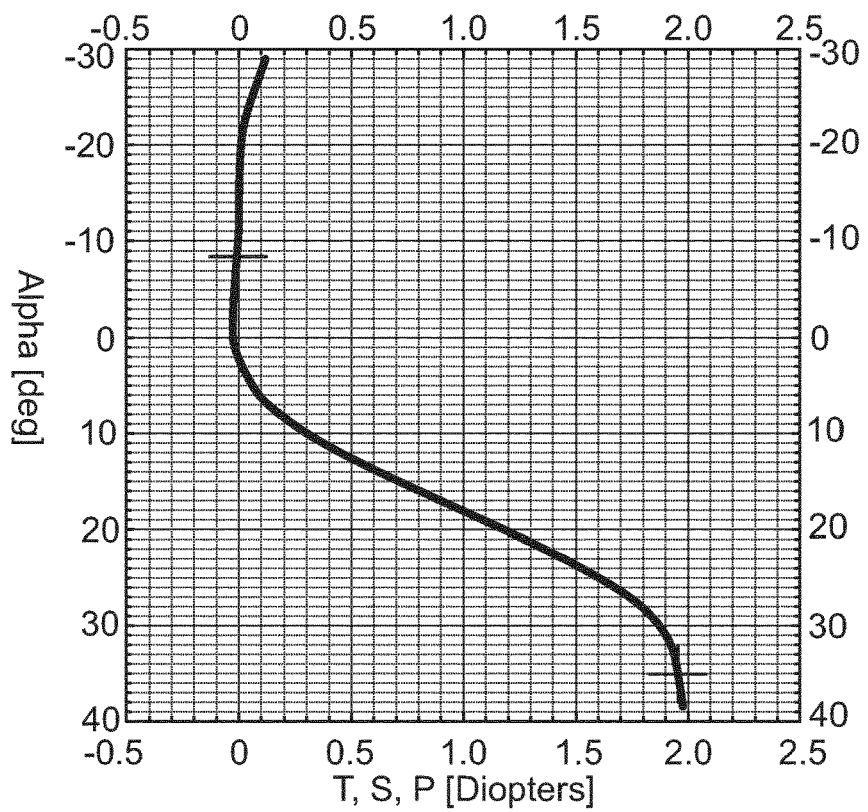

The mean refractive power curve on FIG. 5b has been calculated for a vision distance of 0.4 m.

Figure 5C:
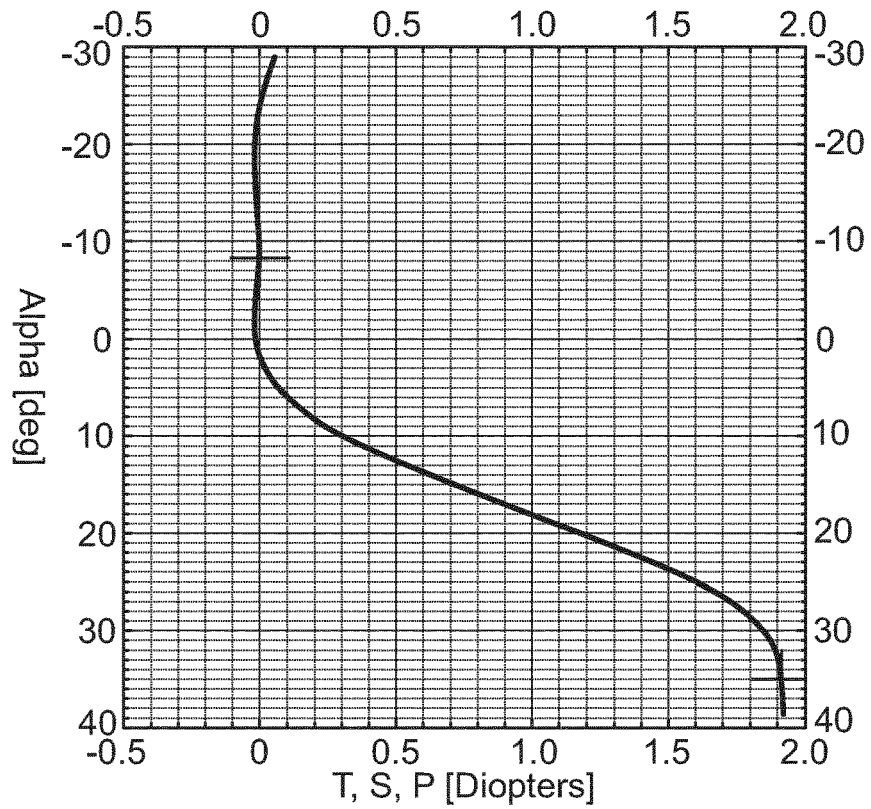

The mean refractive power curve on FIG. 5c has been calculated for a vision distance of 0.6 m.

Figure 5D:
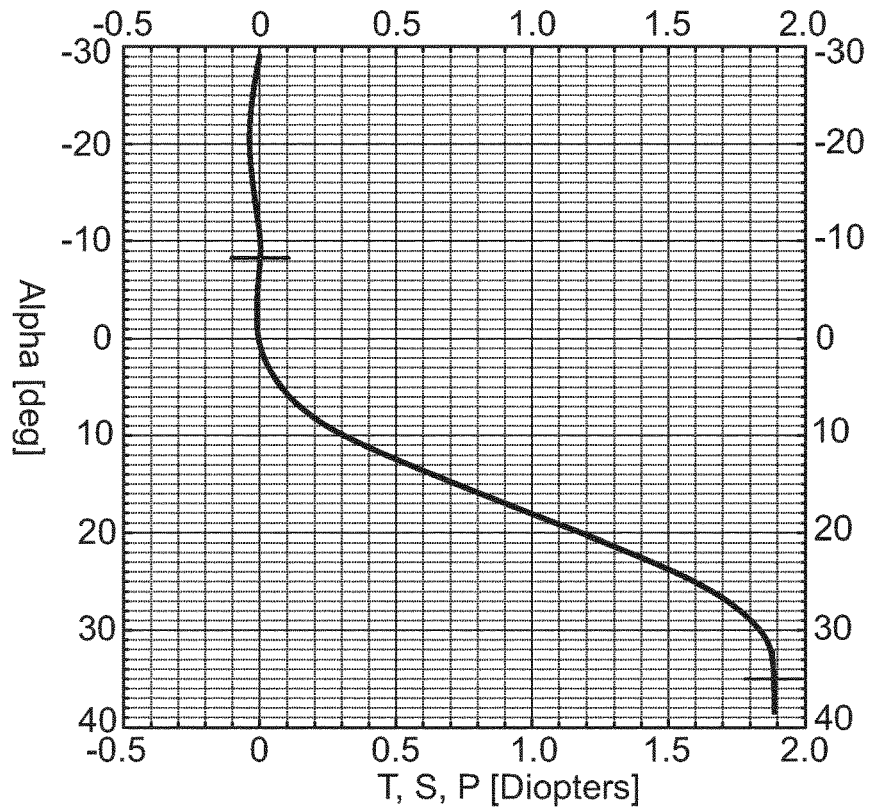

The mean refractive power curve on FIG. 5d has been calculated for a vision distance of 1 m.

Figure 5E:
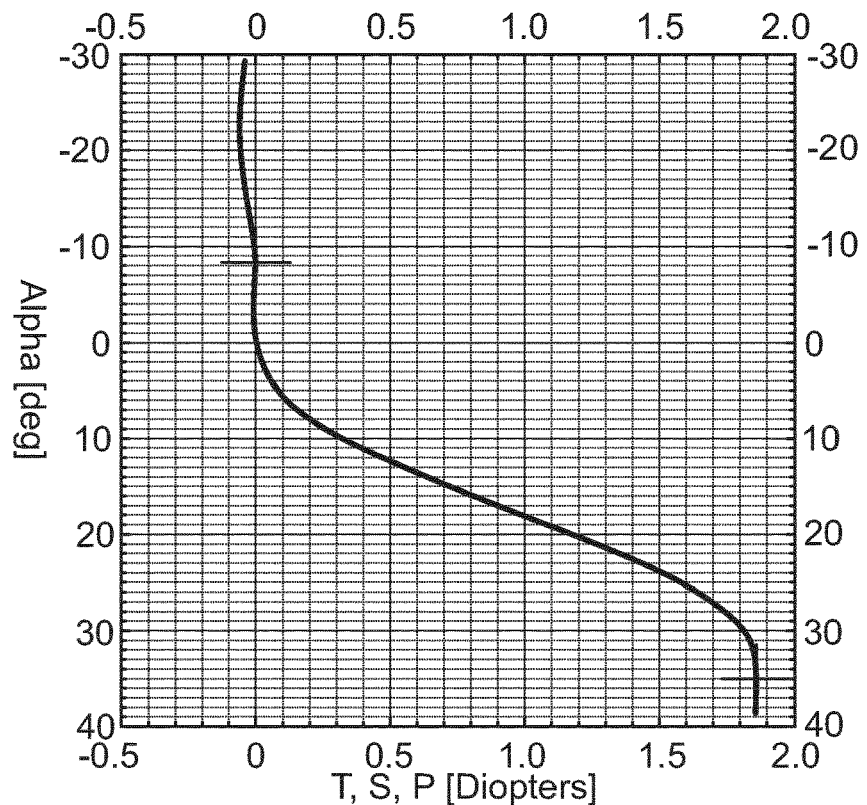

The mean refractive power curve on FIG. 5e has been calculated for a vision distance of 2 m.

Figure 5F:
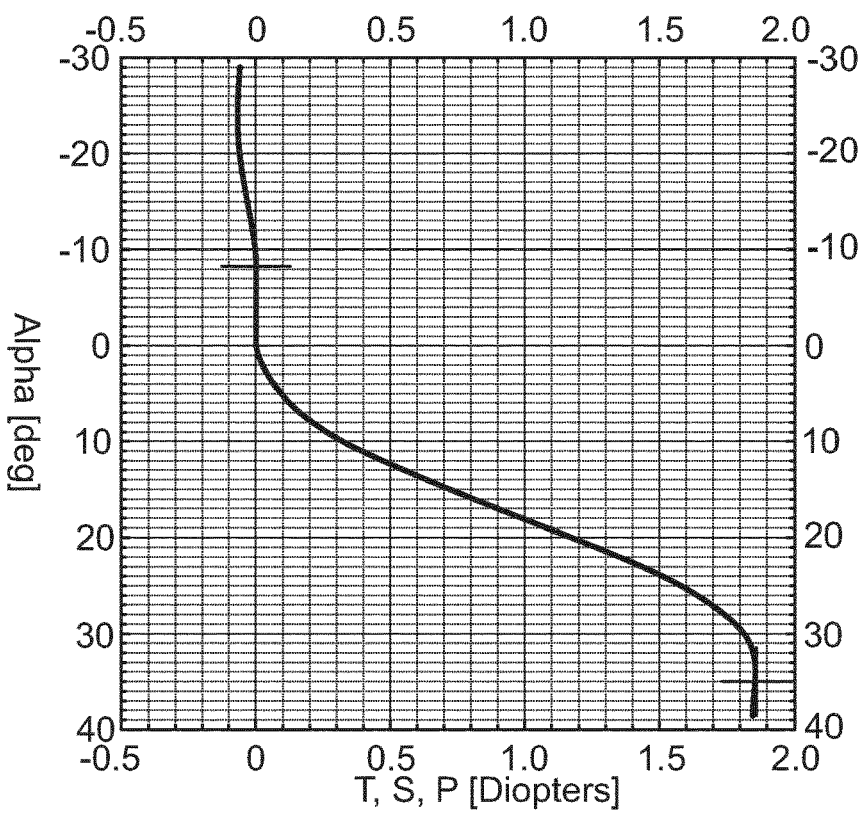

The mean refractive power curve on FIG. 5f has been calculated for a vision distance of 5 m.

Figure 6A:
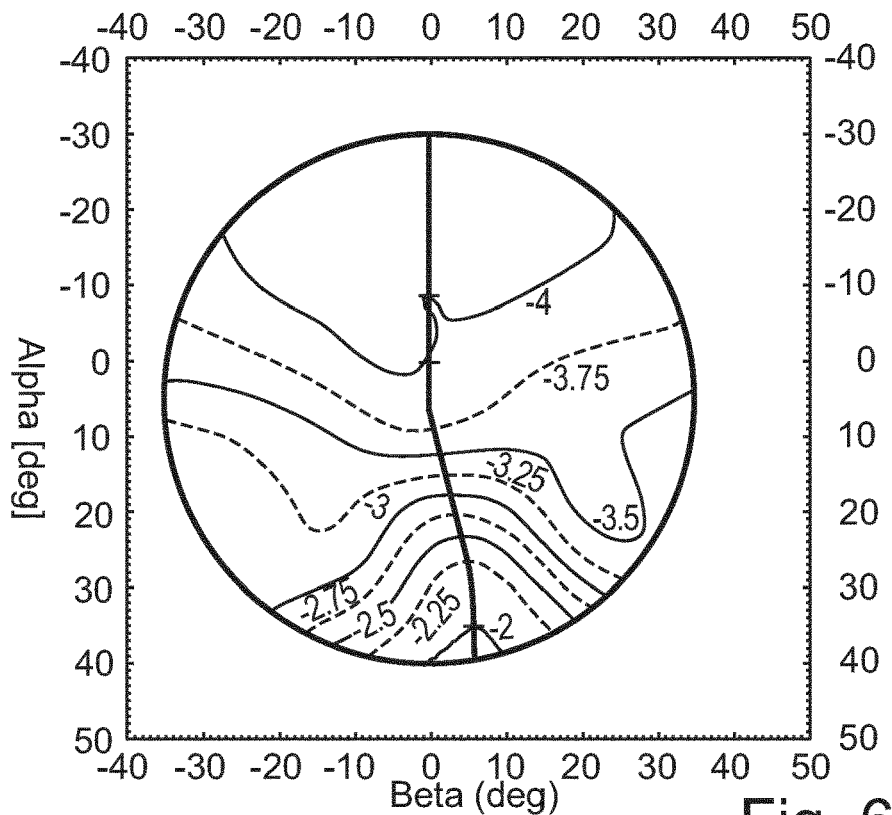
Figure 6B:
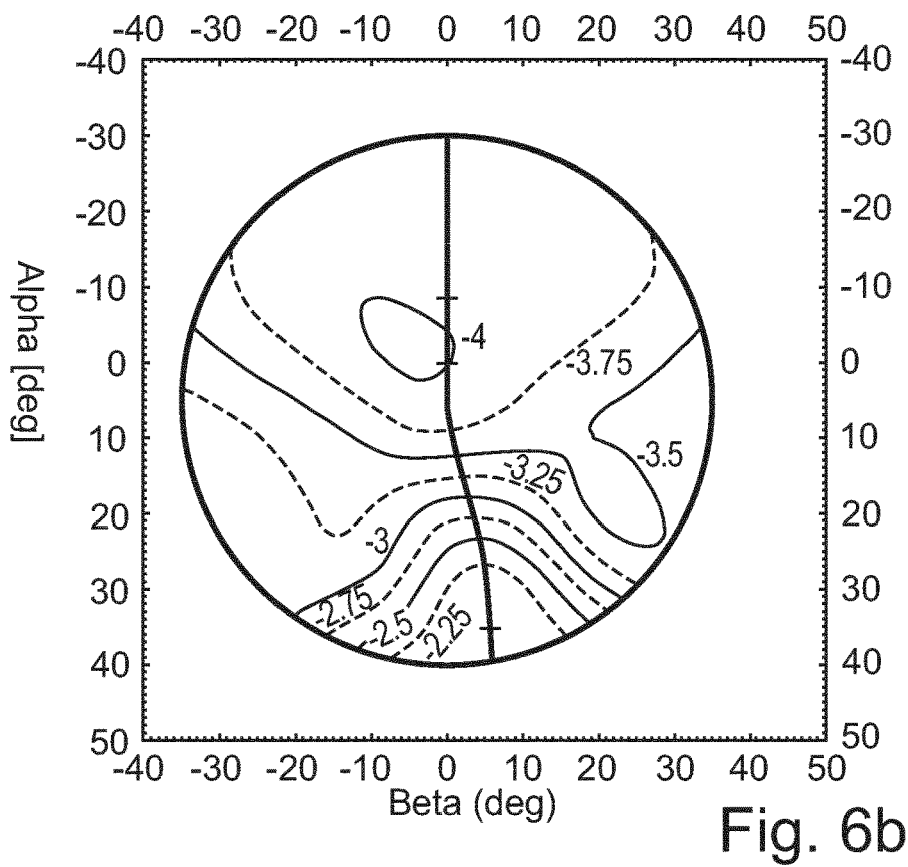

FIGS. 6a to 6b represent the mean refractive power repartition, PPO, over the (α, β) domain, for the said prior art ophthalmic lens. Curves indicates iso-mean refractive power values where there is an increment of 0.25 Diopter between neighboring curves of different iso-mean refractive power values.

The mean refractive power repartition on FIG. 6a has been calculated using a classic ergorama as disclosed in U.S. Pat. No. 6,318,859.

The mean refractive power repartition on FIG. 6b has been calculated for a vision distance of 0.4 m.

Figure 6C:
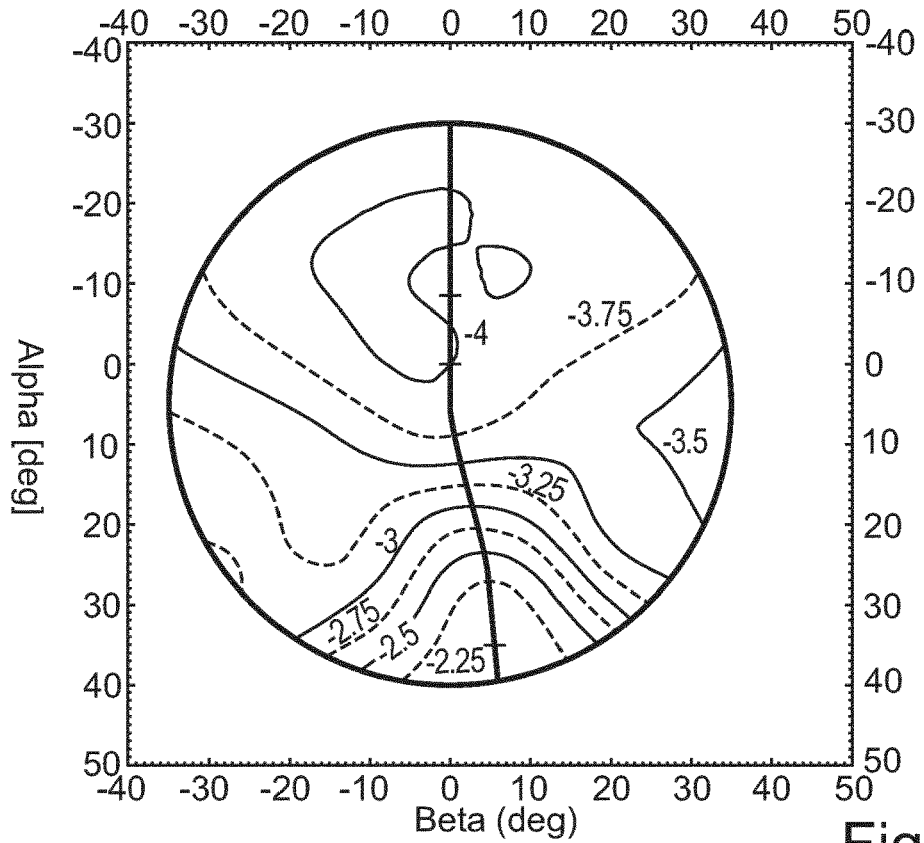

The mean refractive power repartition on FIG. 6c has been calculated for a vision distance of 0.6 m.

Figure 6D:
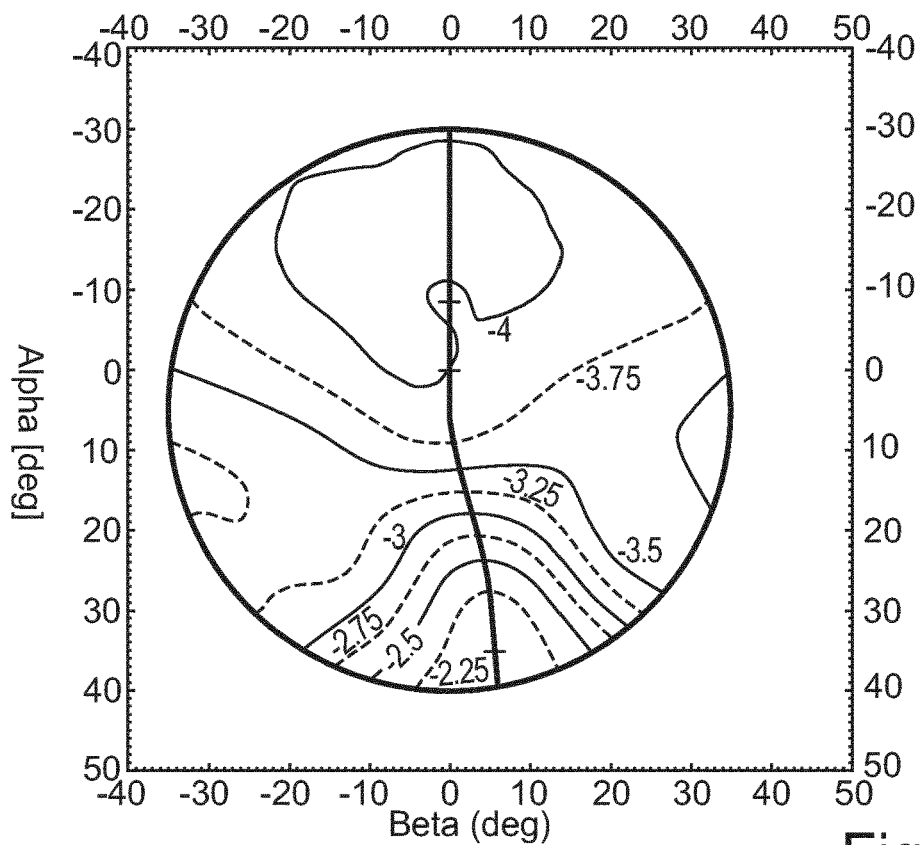

The mean refractive power repartition on FIG. 6d has been calculated for a vision distance of 1 m.

Figure 6E:
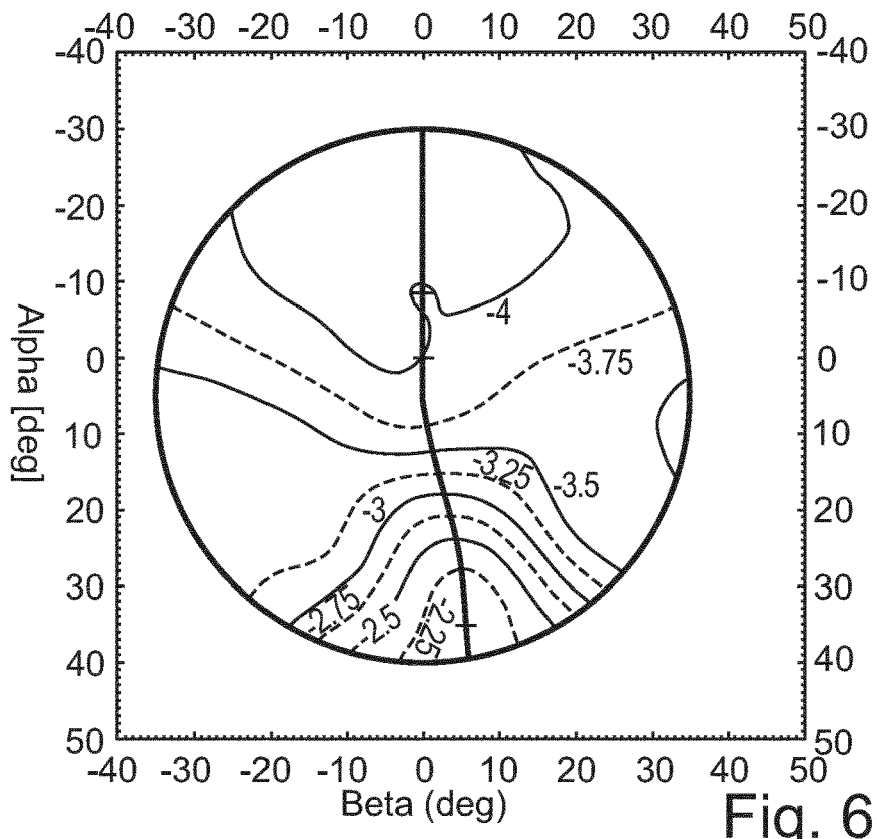

The mean refractive power repartition on FIG. 6e has been calculated for a vision distance of 2 m.

Figure 6F:
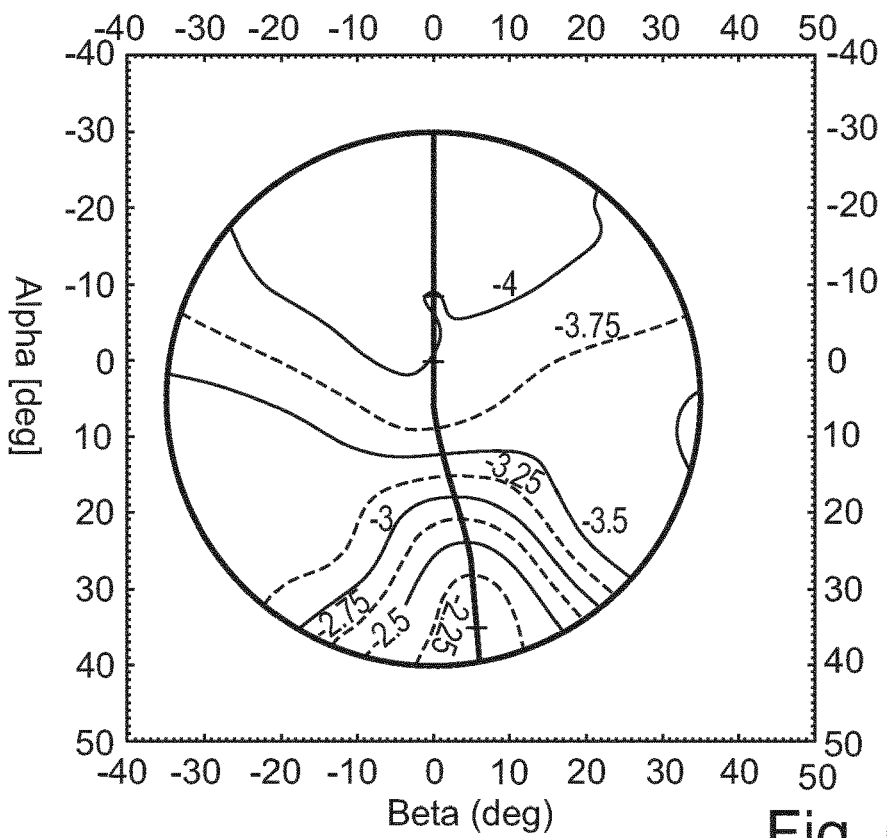

The mean refractive power repartition on FIG. 6f has been calculated for a vision distance of 5 m.

FIGS. 7a to 7f represent the module of resulting astigmatism repartition, ASR, over the (α, β) domain, for the said prior art ophthalmic lens. Curves indicates iso-module of resulting astigmatism values where there is an increment of 0.25 Diopter between neighboring curves of different module of resulting astigmatism values.

Figure 7A:
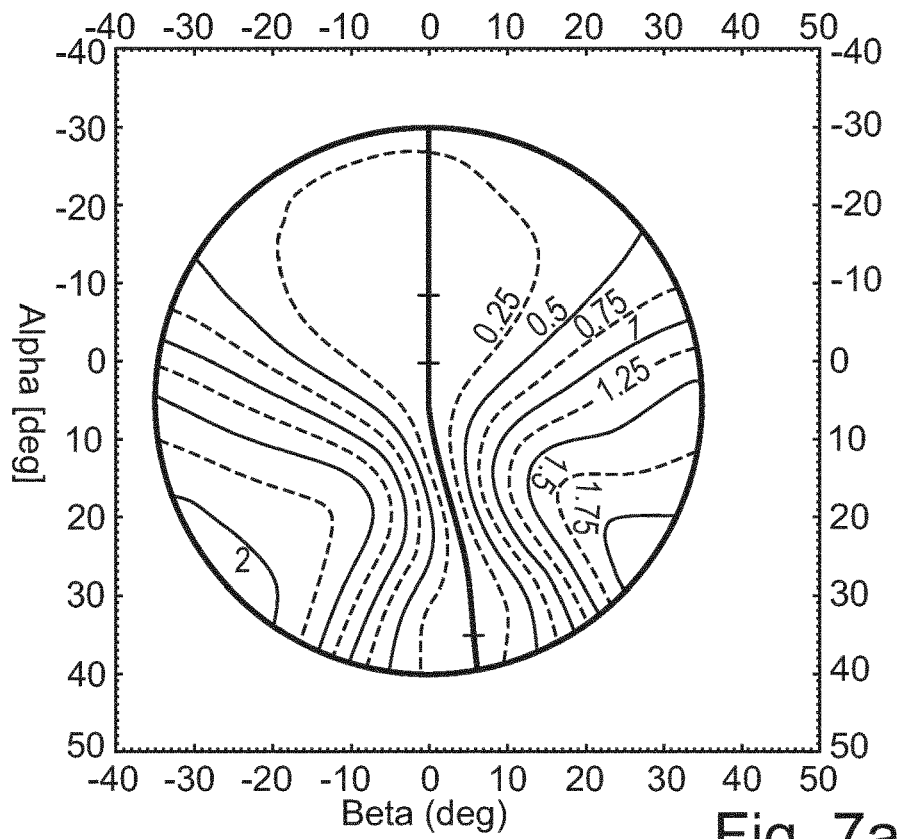

The module of resulting astigmatism repartition on FIG. 7a has been calculated using a classic ergorama as disclosed in U.S. Pat. No. 6,318,859.

Figure 7B:
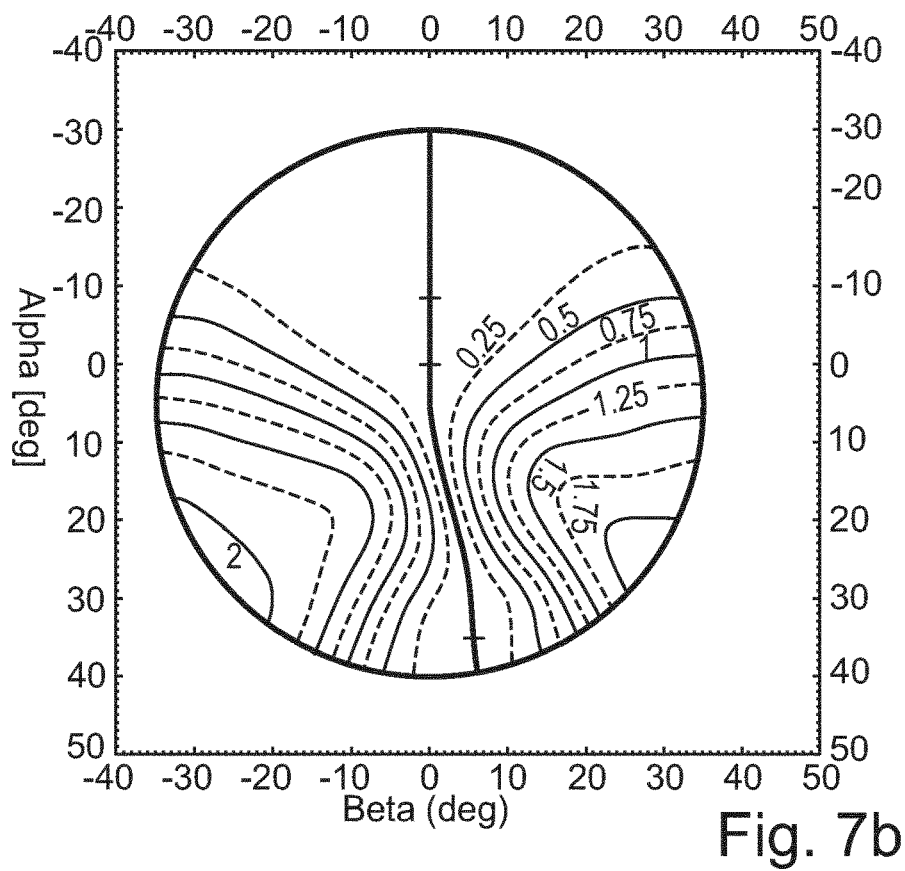

The module of resulting astigmatism repartition on FIG. 7b has been calculated for a vision distance of 0.4 m.

Figure 7C:
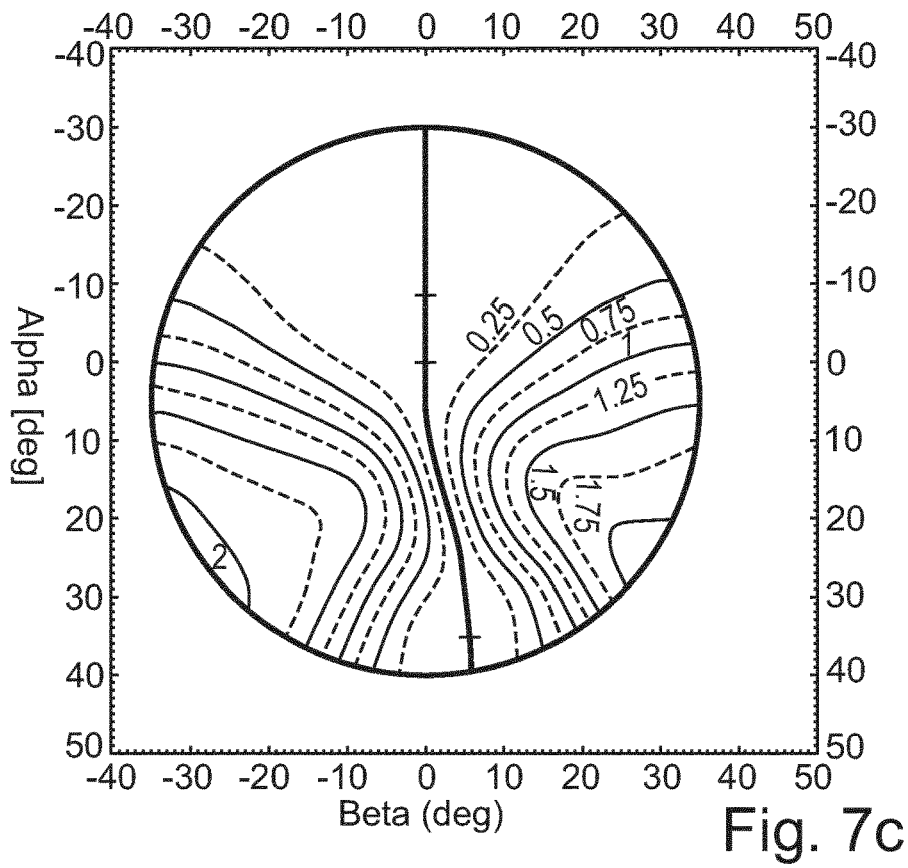

The module of resulting astigmatism repartition on FIG. 7c has been calculated for a vision distance of 0.6 m.

Figure 7D:
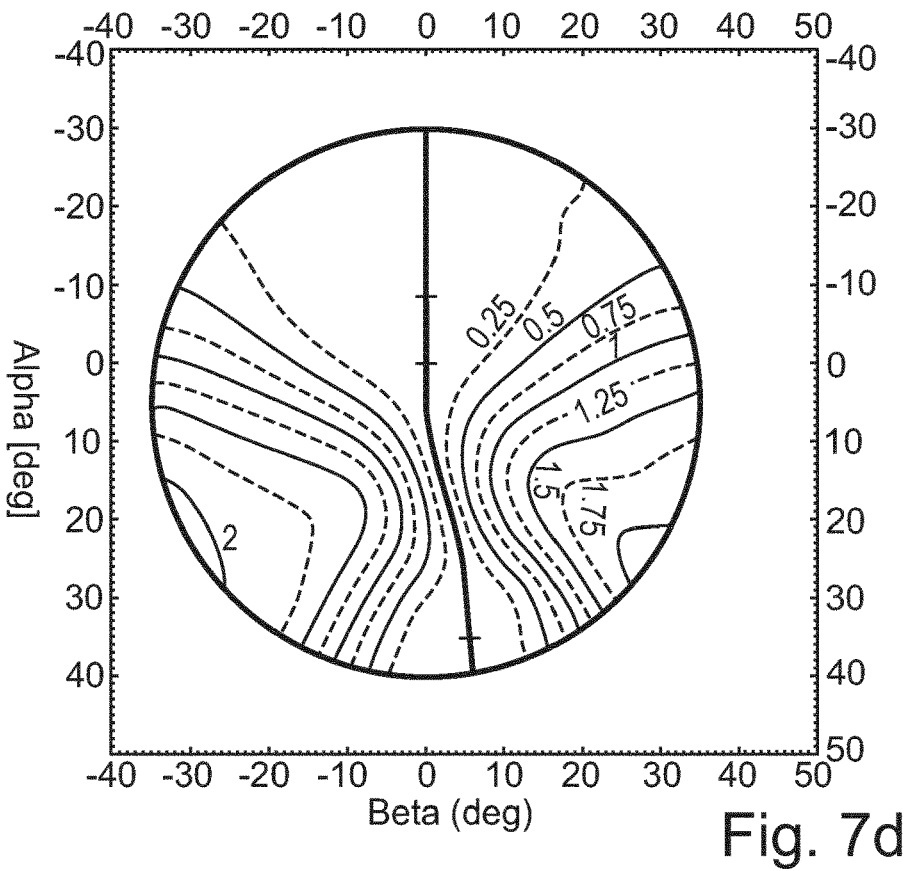

The module of resulting astigmatism repartition on FIG. 7d has been calculated for a vision distance of 1 m.

Figure 7E:
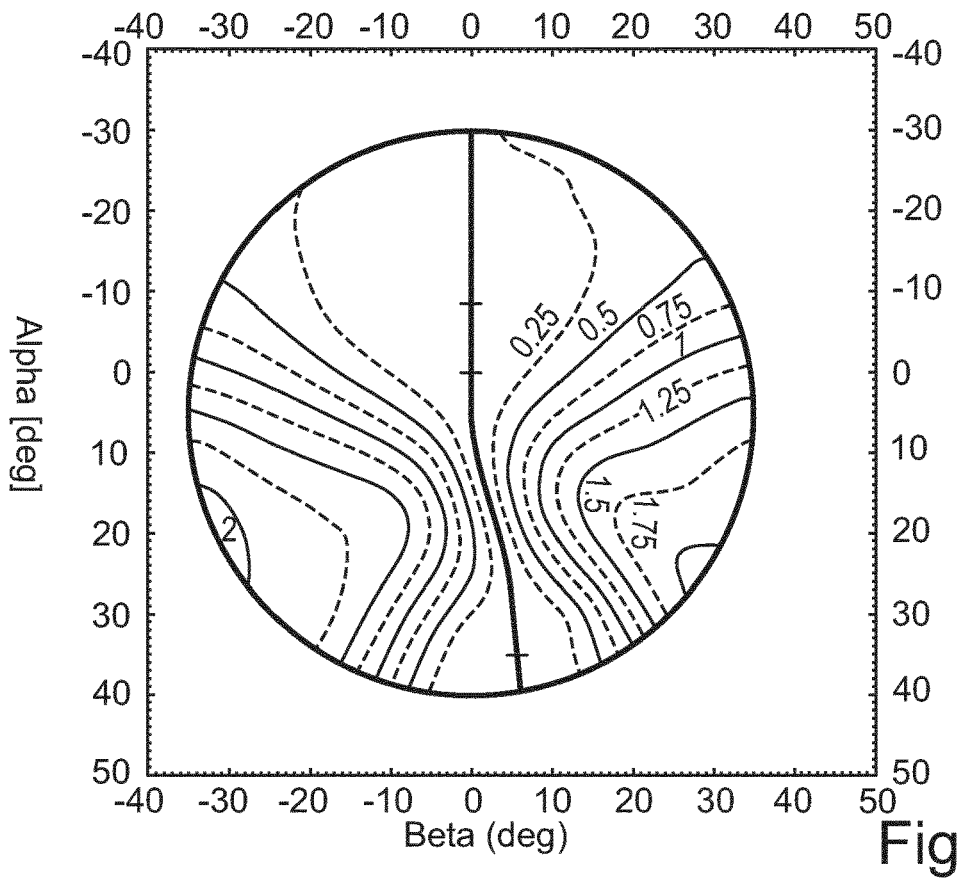

The module of resulting astigmatism repartition on FIG. 7e has been calculated for a vision distance of 2 m.

Figure 7F:
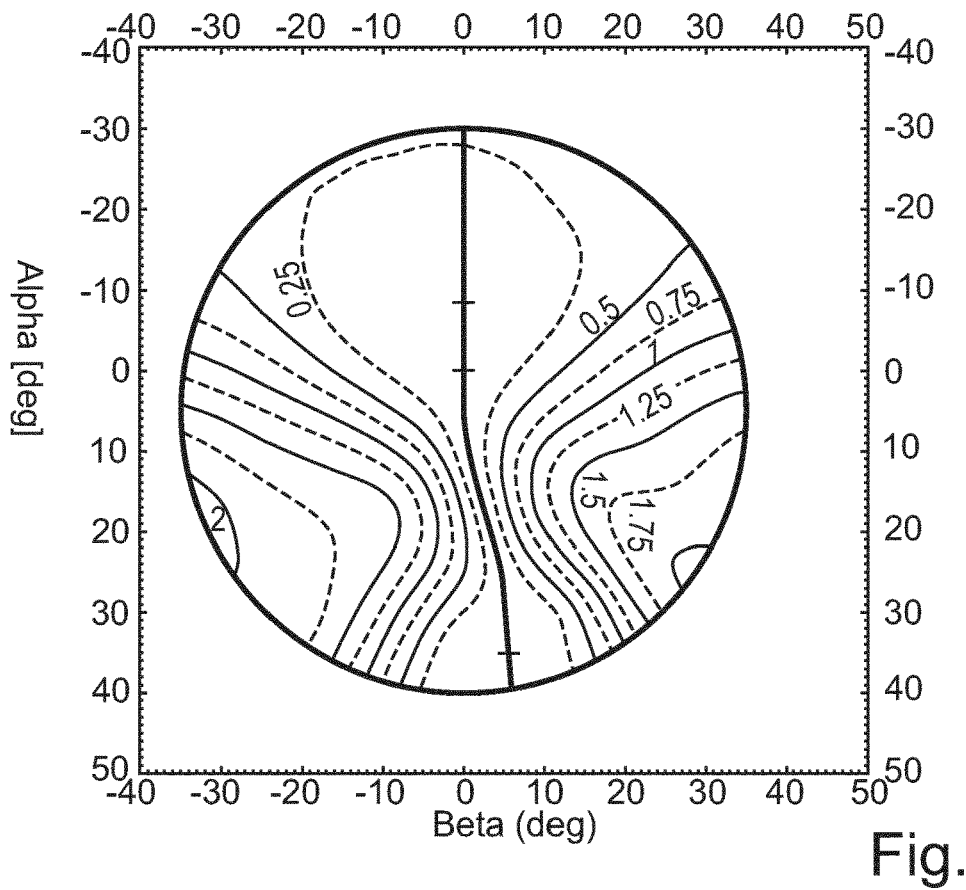

The module of resulting astigmatism repartition on FIG. 7f has been calculated for a vision distance of 5 m.

FIGS. 8a to 10f show features of a progressive ophthalmic lens according to the invention.

FIGS. 8a to 8f shows mean refractive power curve along the meridian. The x-axes are graduated in diopters, and the y-axes is the angle α in deg along the meridian of the said ophthalmic lens according to the invention.

Figure 8A:
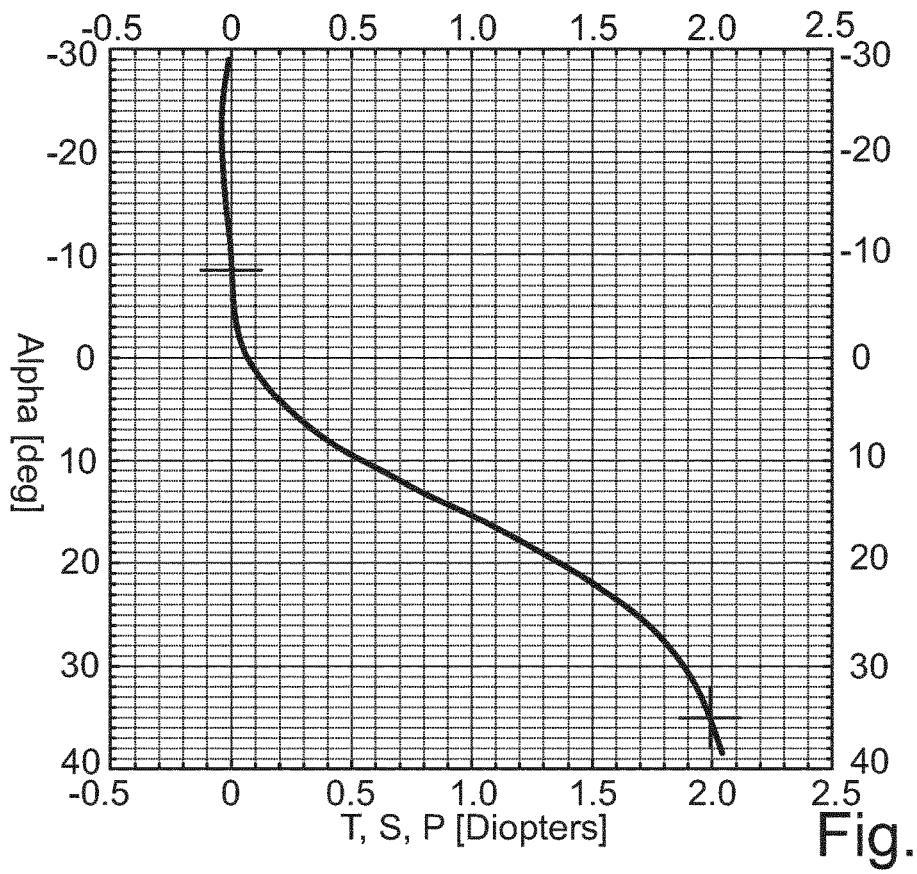
FIGS. 8a to 10f give optical characteristics of a progressive ophthalmic according to the invention.

The mean refractive power curve on FIG. 8a has been calculated using a classic ergorama as disclosed in U.S. Pat. No. 6,318,859.

Figure 8B:
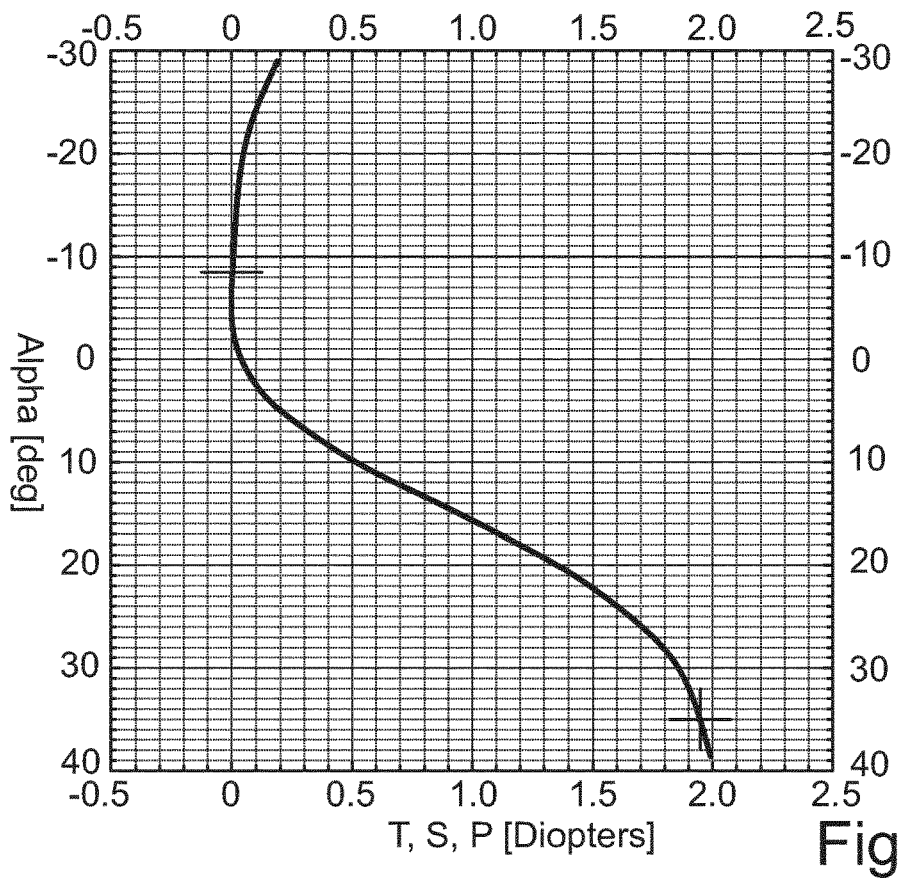

The mean refractive power curve on FIG. 8b has been calculated for a vision distance of 0.4 m.

Figure 8C:
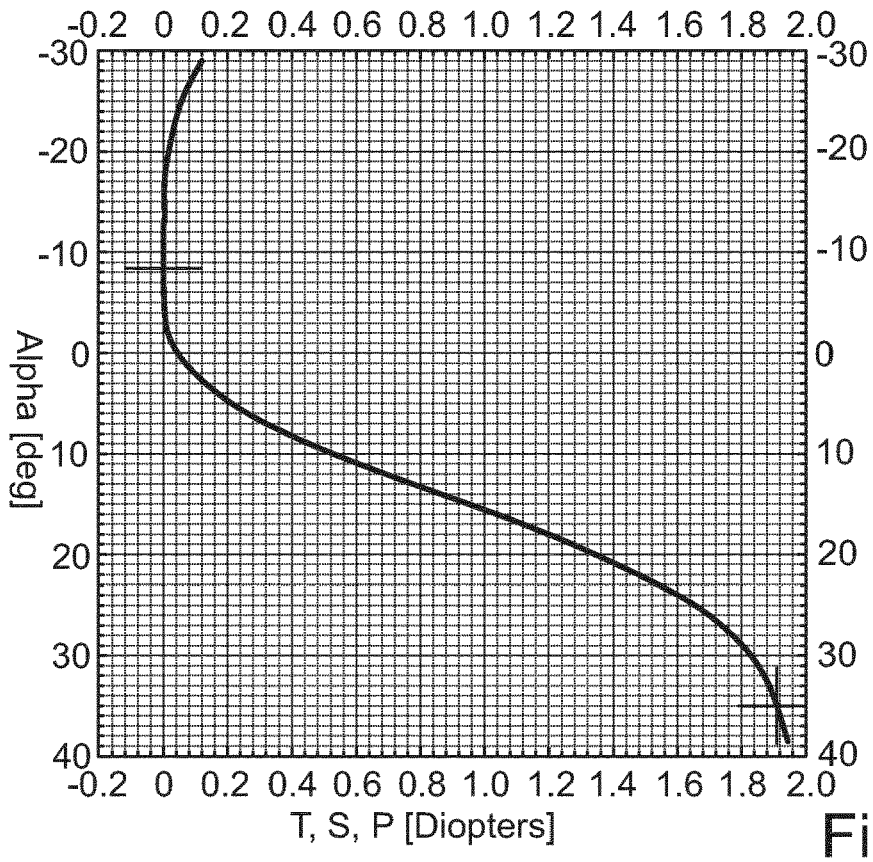

The mean refractive power curve on FIG. 8c has been calculated for a vision distance of 0.6 m.

Figure 8D:
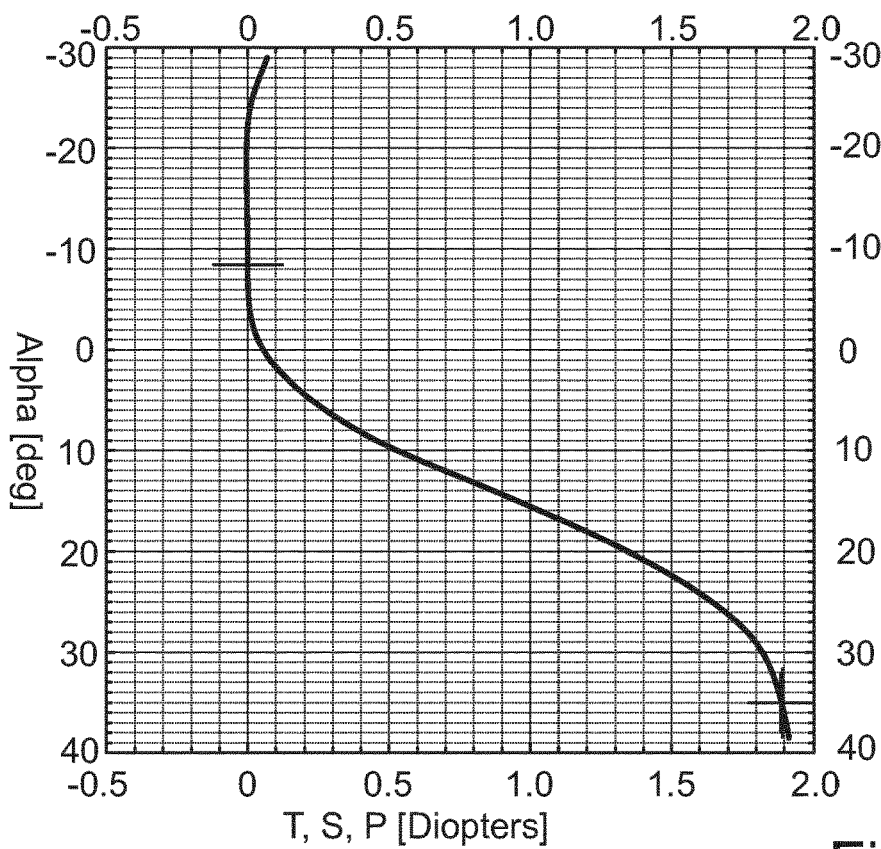

The mean refractive power curve on FIG. 8d has been calculated for a vision distance of 1 m.

Figure 8E:
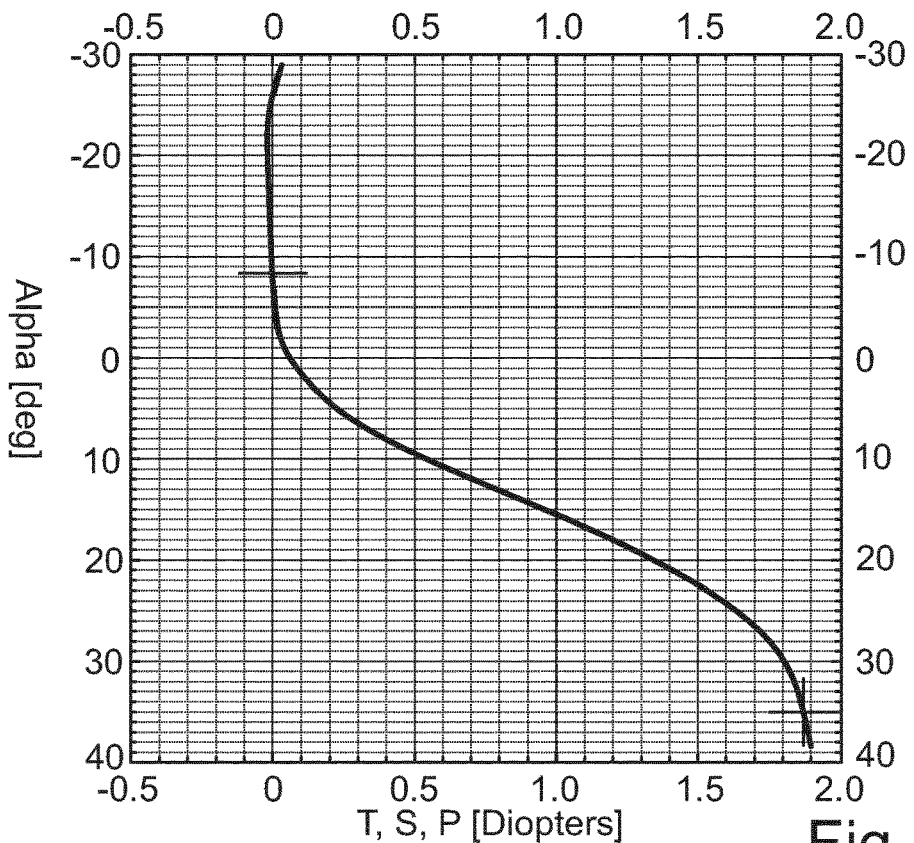

The mean refractive power curve on FIG. 8e has been calculated for a vision distance of 2 m.

Figure 8F:
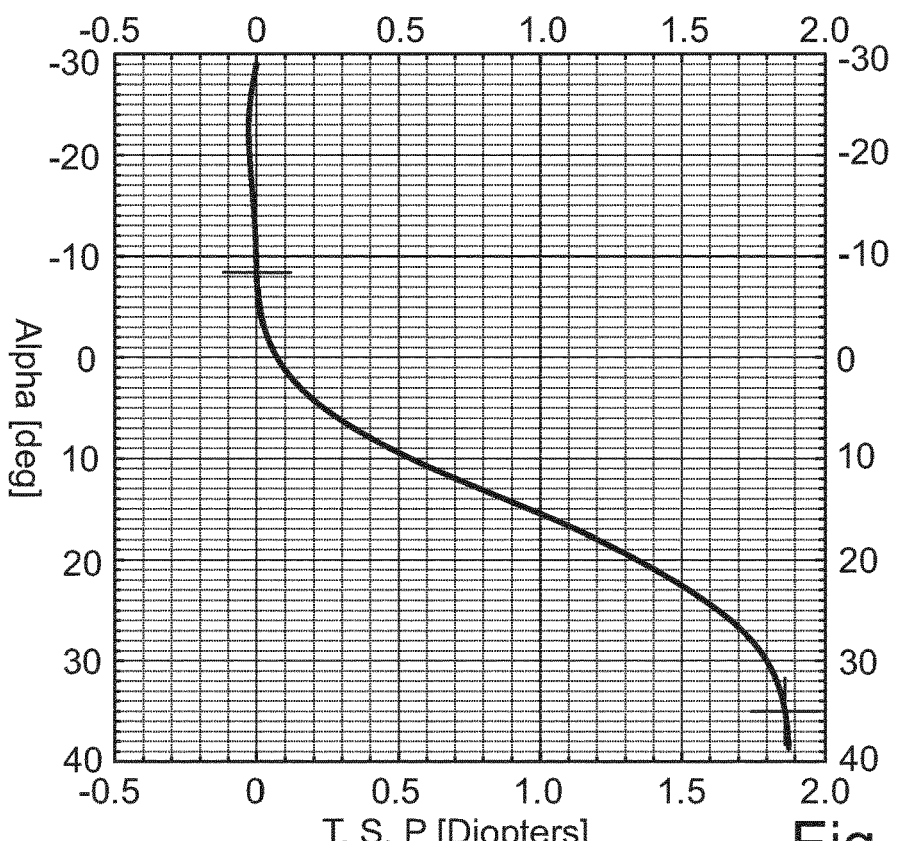

The mean refractive power curve on FIG. 8f has been calculated for a vision distance of 5 m.

Figure 9A:
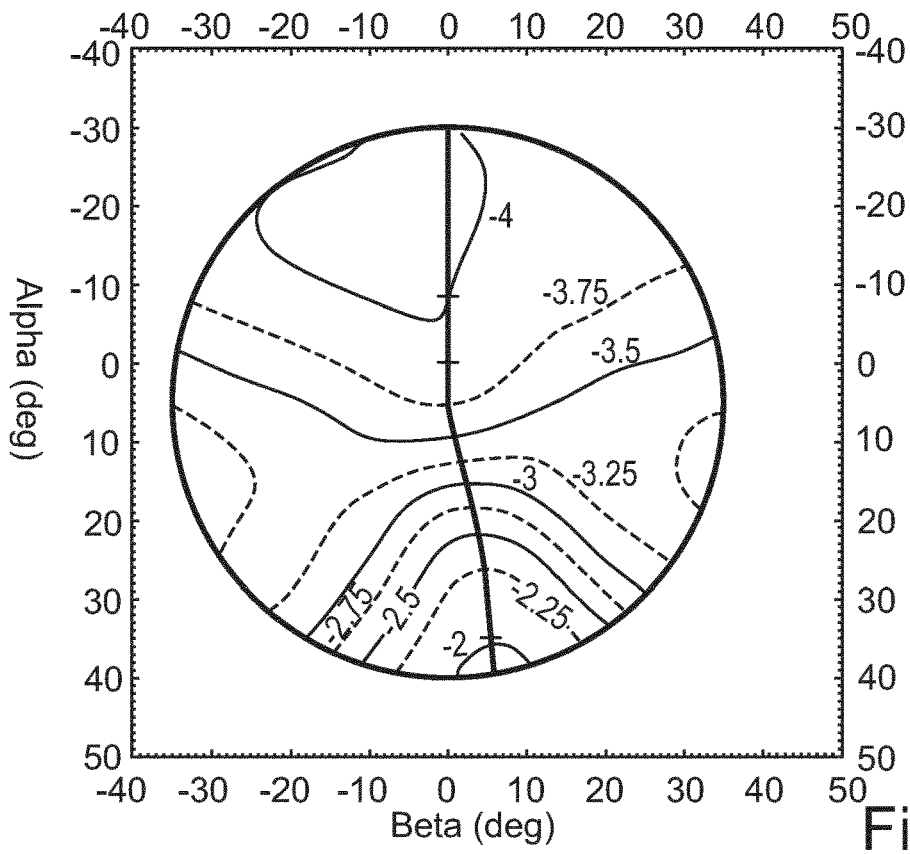
Figure 9B:
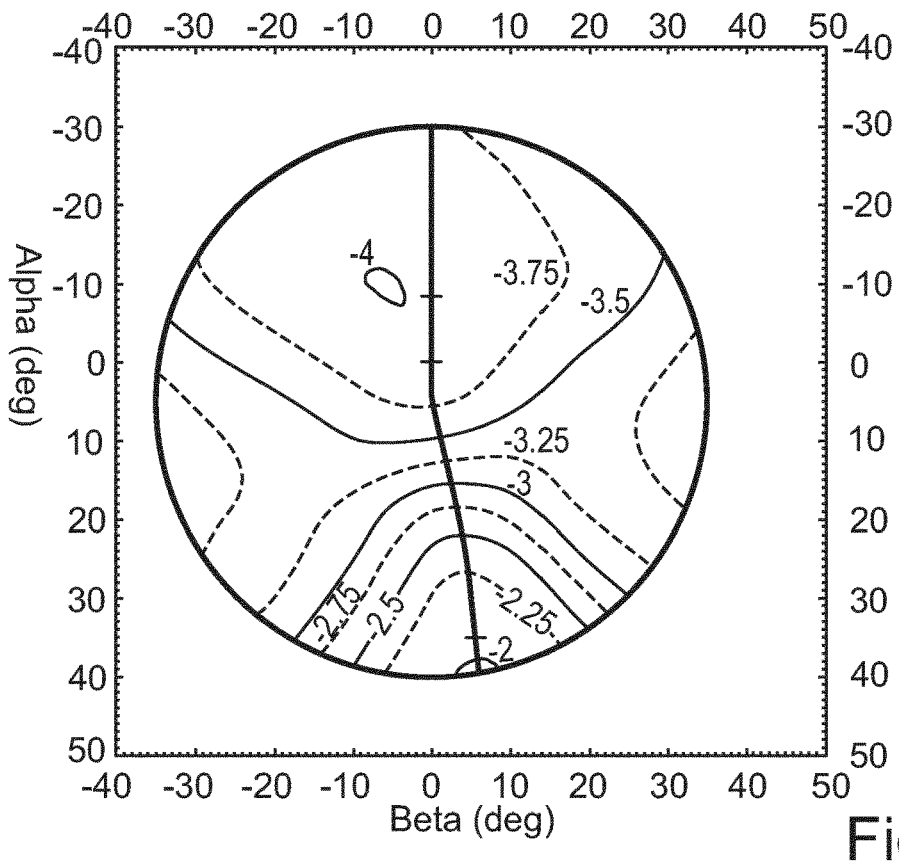

FIGS. 9a to 9b represent the mean refractive power repartition, PPO, over the (α, β) domain, for the said ophthalmic lens according to the invention. Curves indicates iso-mean refractive power values where there is an increment of 0.25 Diopter between neighboring curves of different iso-mean refractive power values.

The mean refractive power repartition on FIG. 9a has been calculated using a classic ergorama as disclosed in U.S. Pat. No. 6,318,859.

The mean refractive power repartition on FIG. 9b has been calculated for a vision distance of 0.4 m.

Figure 9C:
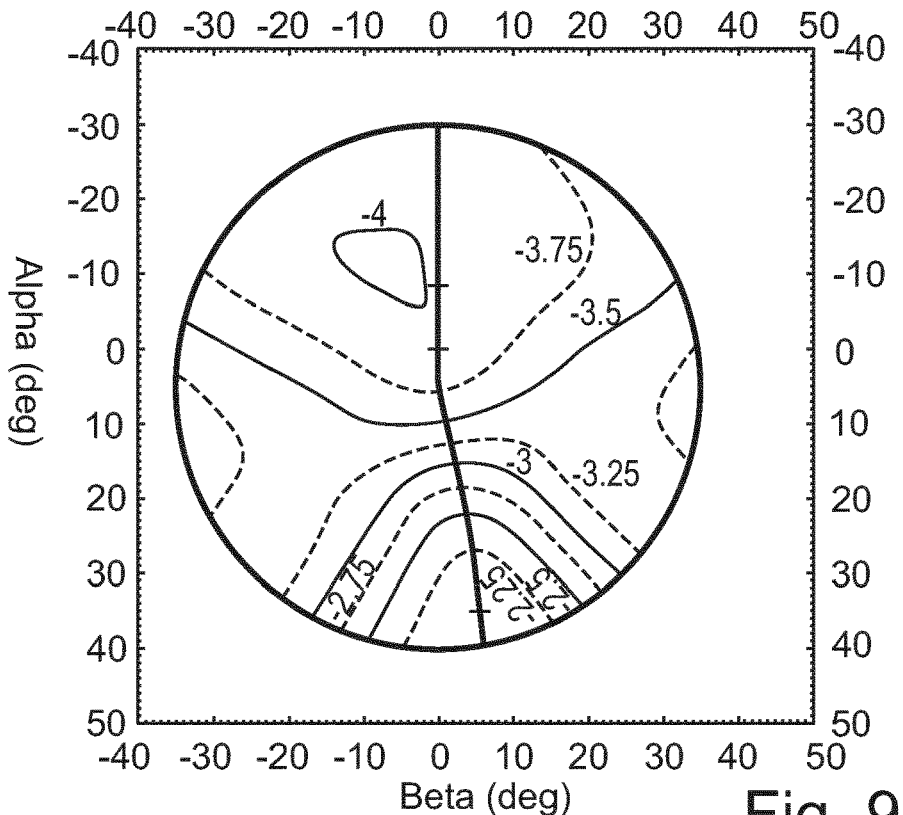

The mean refractive power repartition on FIG. 9c has been calculated for a vision distance of 0.6 m.

Figure 9D:
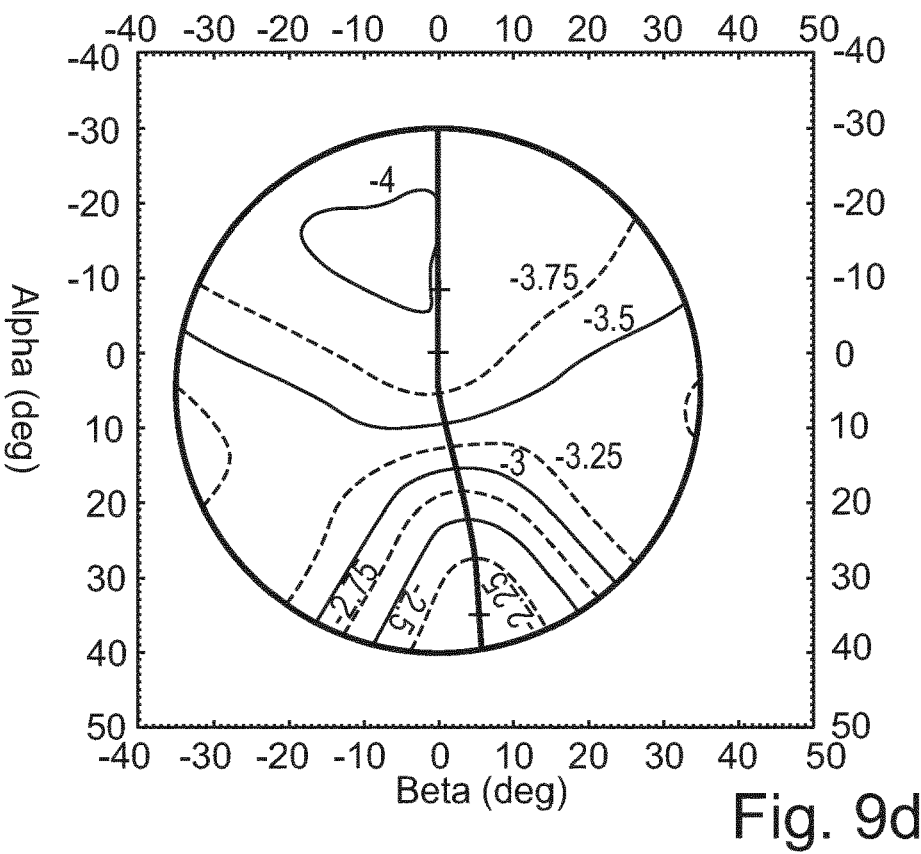

The mean refractive power repartition on FIG. 9d has been calculated for a vision distance of 1 m.

Figure 9E:
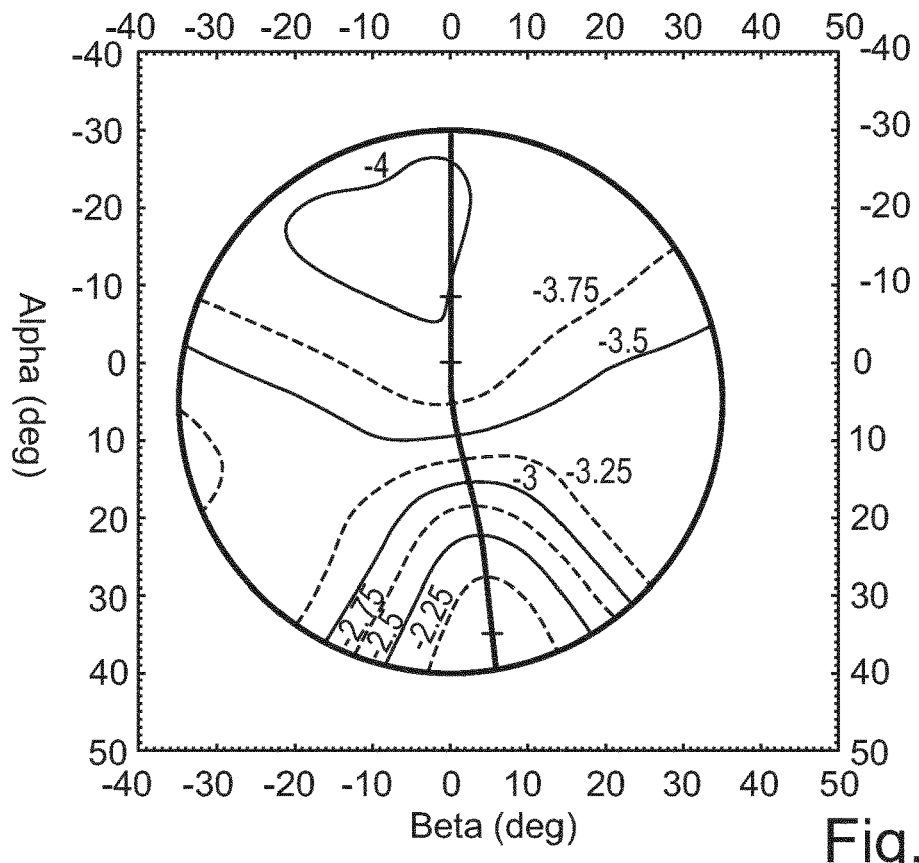

The mean refractive power repartition on FIG. 9e has been calculated for a vision distance of 2 m.

Figure 9F:
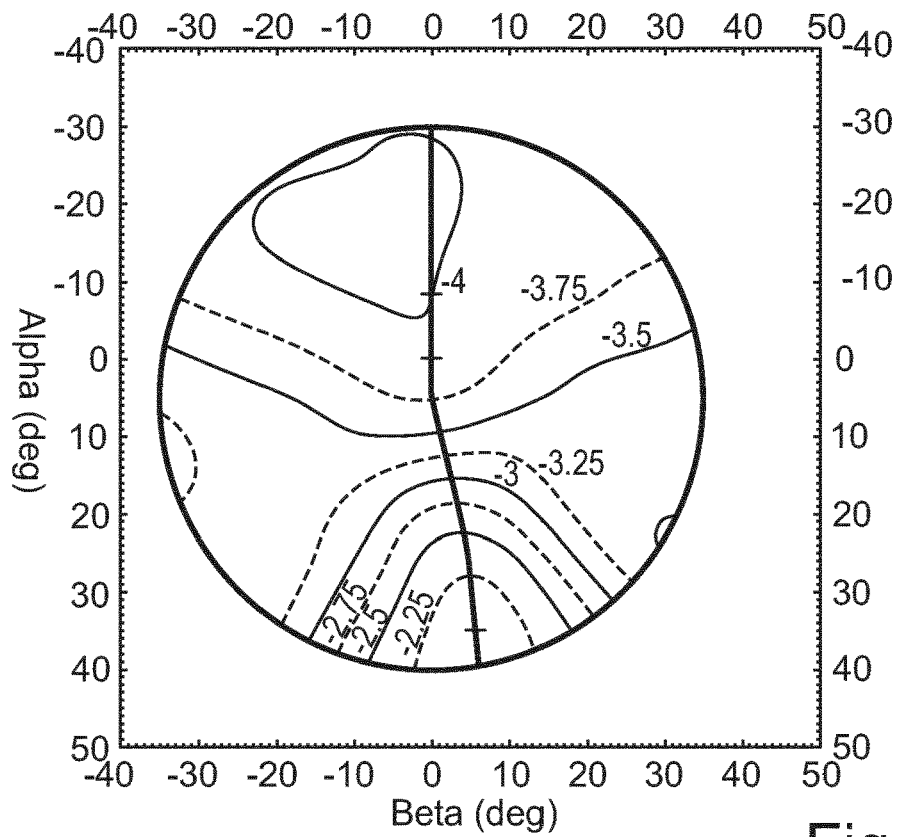

The mean refractive power repartition on FIG. 9f has been calculated for a vision distance of 5 m.

FIGS. 10a to 10f represent the module of resulting astigmatism repartition, ASR, over the (α, β) domain, for the said ophthalmic lens according to the invention. Curves indicates iso-module of resulting astigmatism values where there is an increment of 0.25 Diopter between neighboring curves of different module of resulting astigmatism values.

Figure 10A:
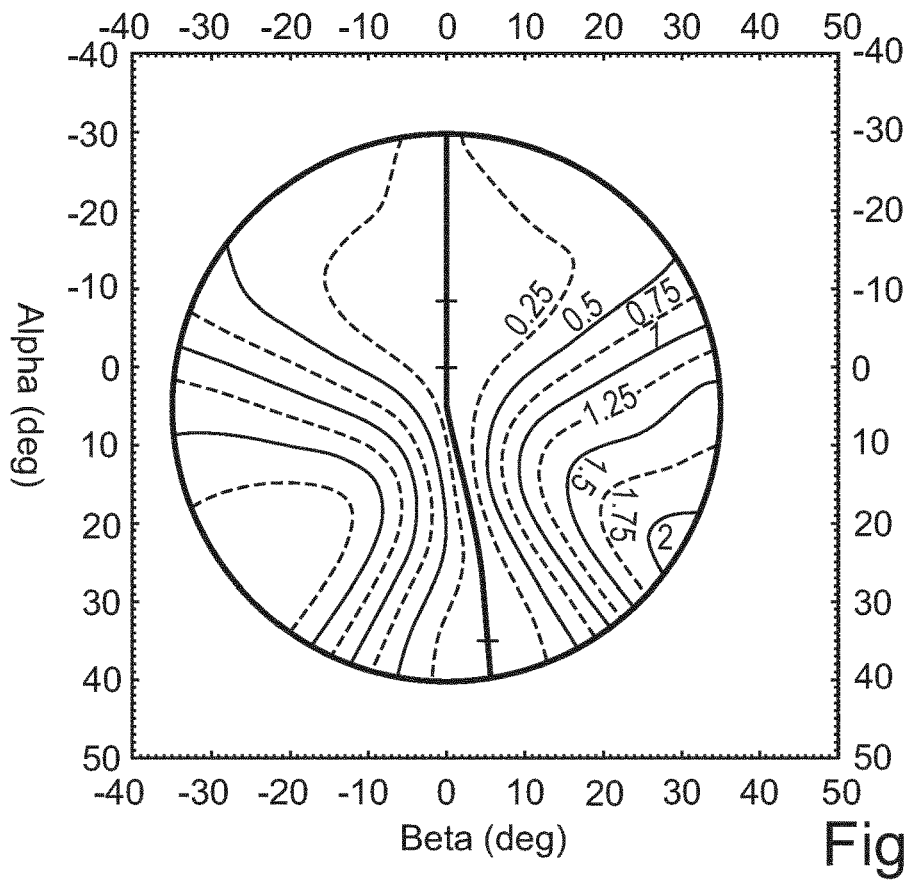

The module of resulting astigmatism repartition on FIG. 10a has been calculated using a classic ergorama as disclosed in U.S. Pat. No. 6,318,859.

Figure 10B:
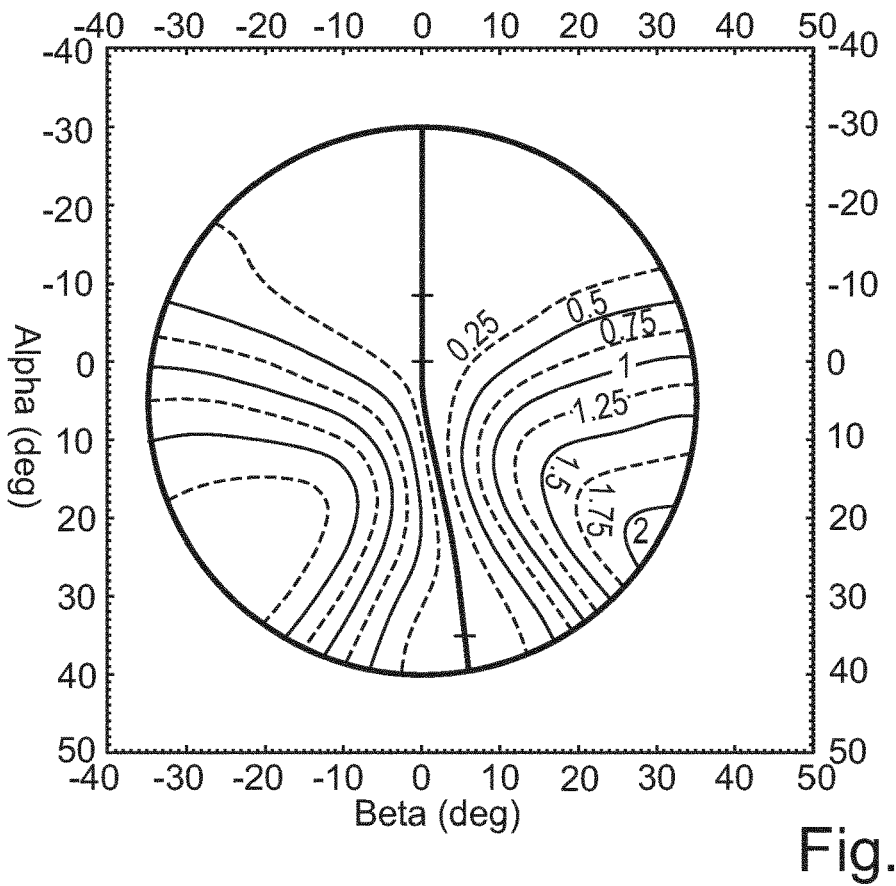

The module of resulting astigmatism repartition on FIG. 10b has been calculated for a vision distance of 0.4 m.

Figure 10C:
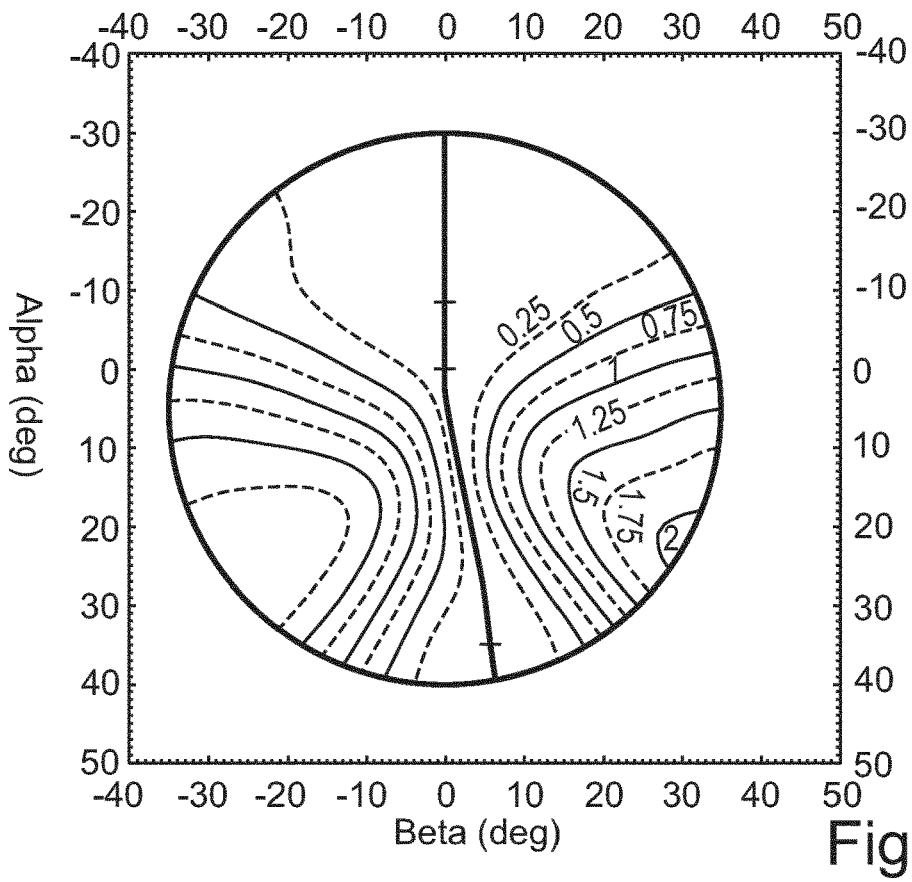

The module of resulting astigmatism repartition on FIG. 10c has been calculated for a vision distance of 0.6 m.

Figure 10D:
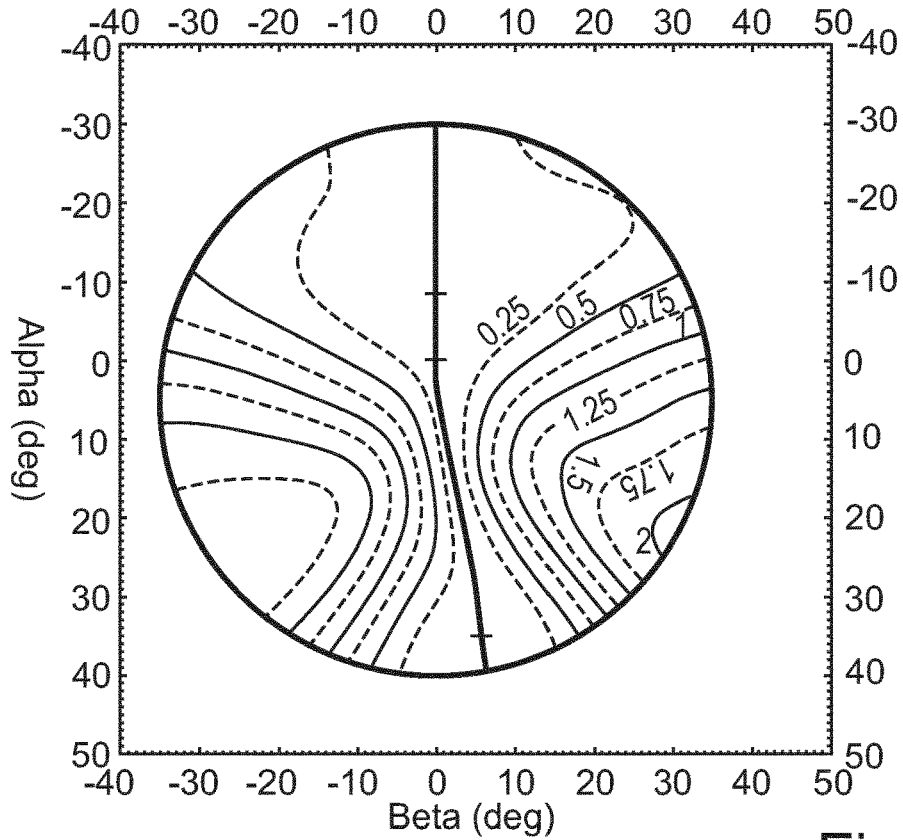

The module of resulting astigmatism repartition on FIG. 10d has been calculated for a vision distance of 1 m.

Figure 10E:
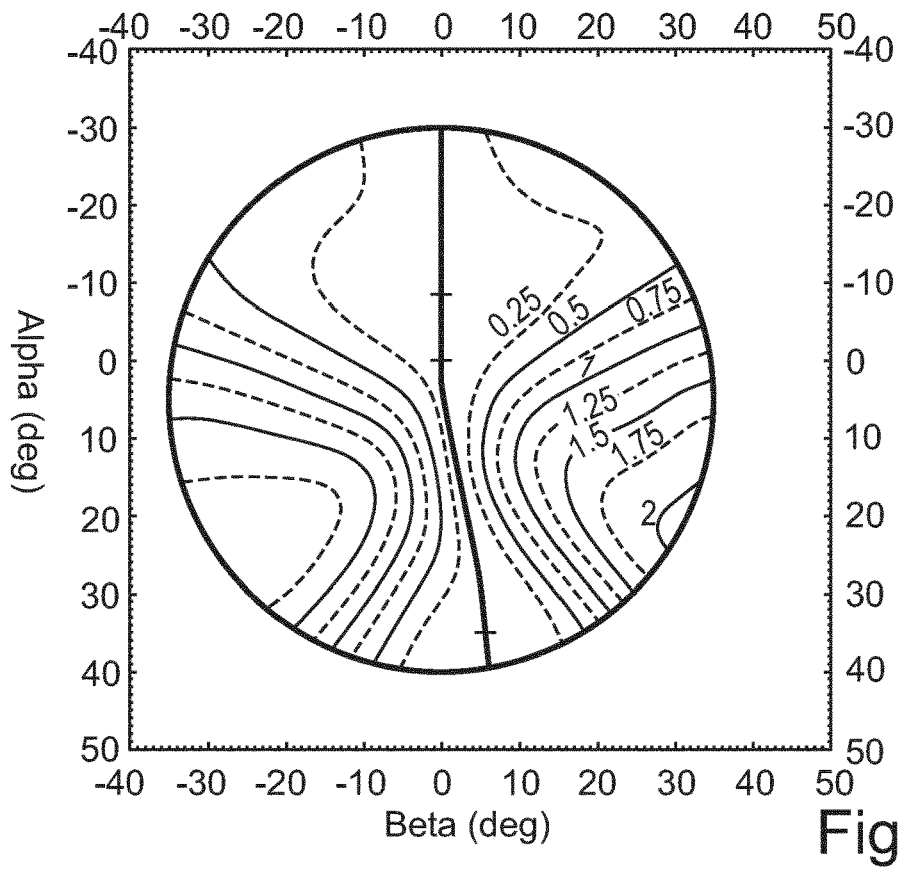

The module of resulting astigmatism repartition on FIG. 10e has been calculated for a vision distance of 2 m.

Figure 10F:
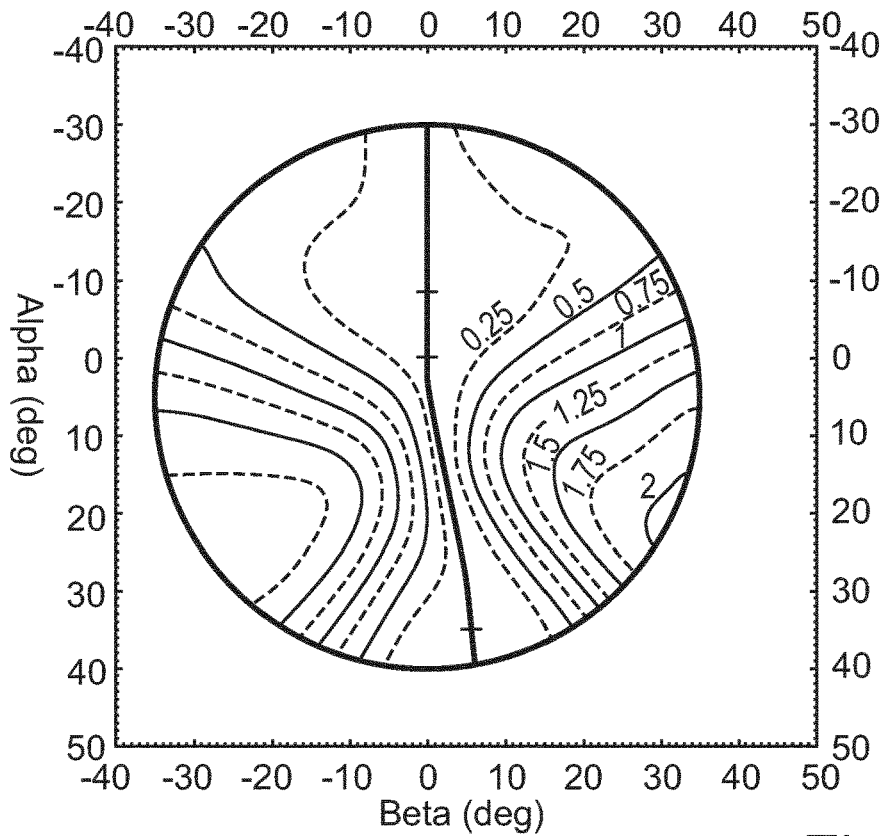

The module of resulting astigmatism repartition on FIG. 10f has been calculated for a vision distance of 5 m.

The areas of gaze direction for which the acuity loss is below 0.15 LogMAR have been determined for five different vision distances for the prior ophthalmic lens illustrated on FIGS. 5a to 7f and the progressive ophthalmic lens of the invention represented on FIGS. 8a to 10f.

FIGS. 11a to 11e show the limits of the calculated areas of gaze directions in solid line for the progressive ophthalmic lens according to the invention and in dotted line for the prior art progressive ophthalmic lens.

Figure 11A:
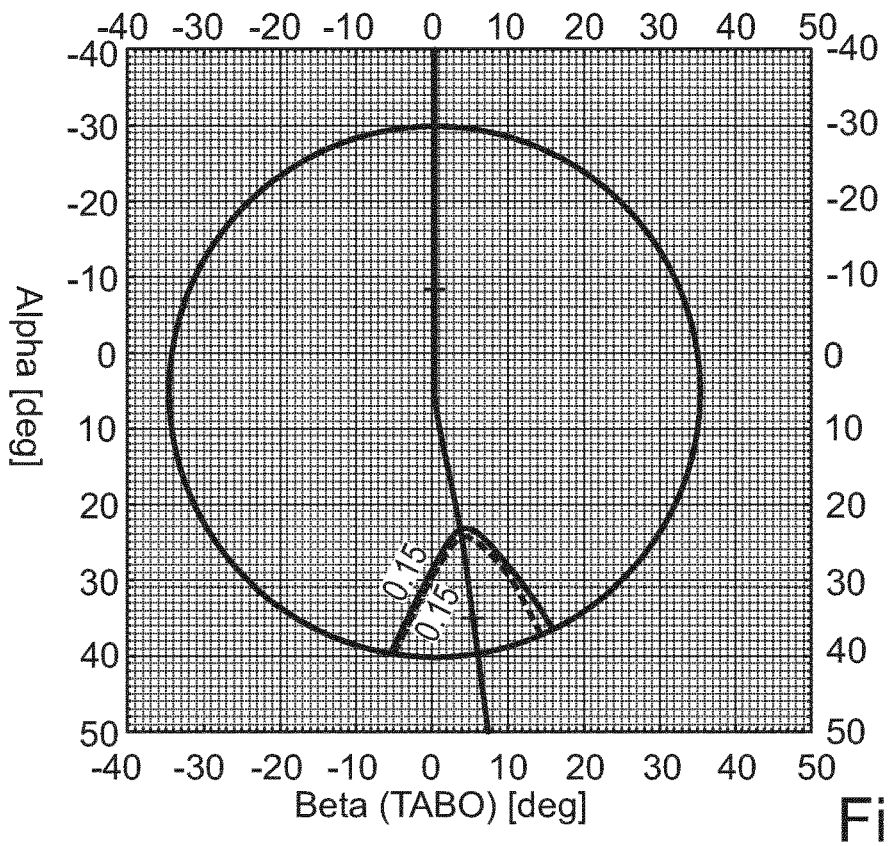
FIGS. 11a to 11e compare area of gaze directions for which the acuity loss is below a threshold value between a progressive ophthalmic lens of the invention and a prior art progressive ophthalmic lens.

The areas of gaze directions represented on FIG. 11a has been calculated for a vision distance of 0.4 m.

Figure 11B:
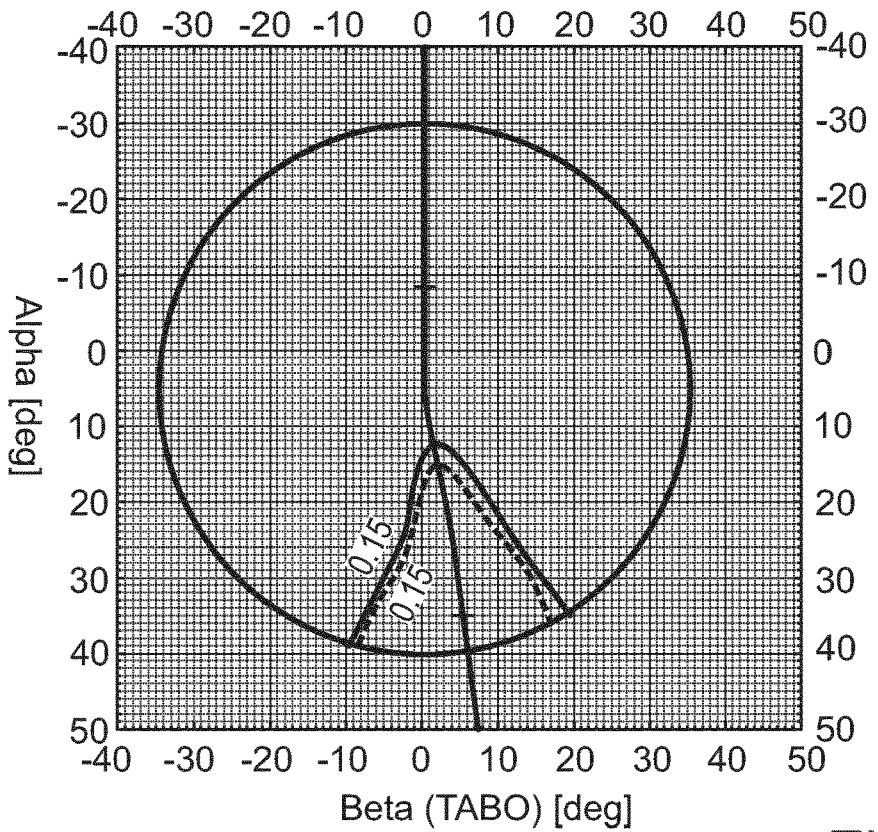

The areas of gaze directions represented on FIG. 11b has been calculated for a vision distance of 0.6 m.

Figure 11C:
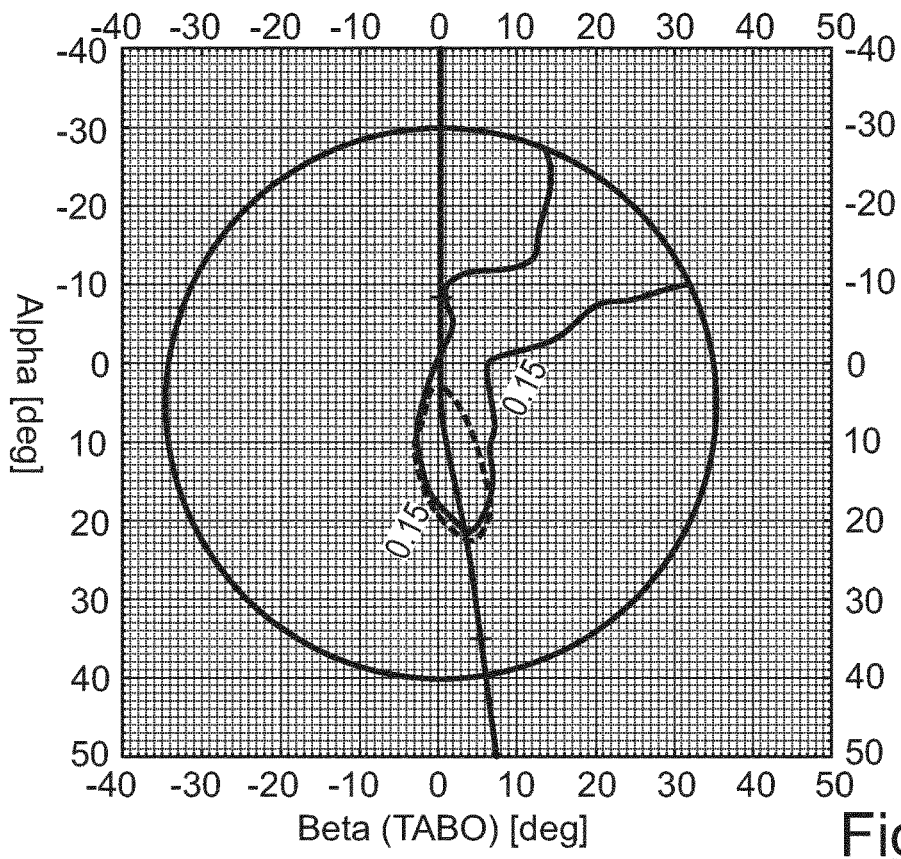

The areas of gaze directions represented on FIG. 11c has been calculated for a vision distance of 1 m.

Figure 11D:
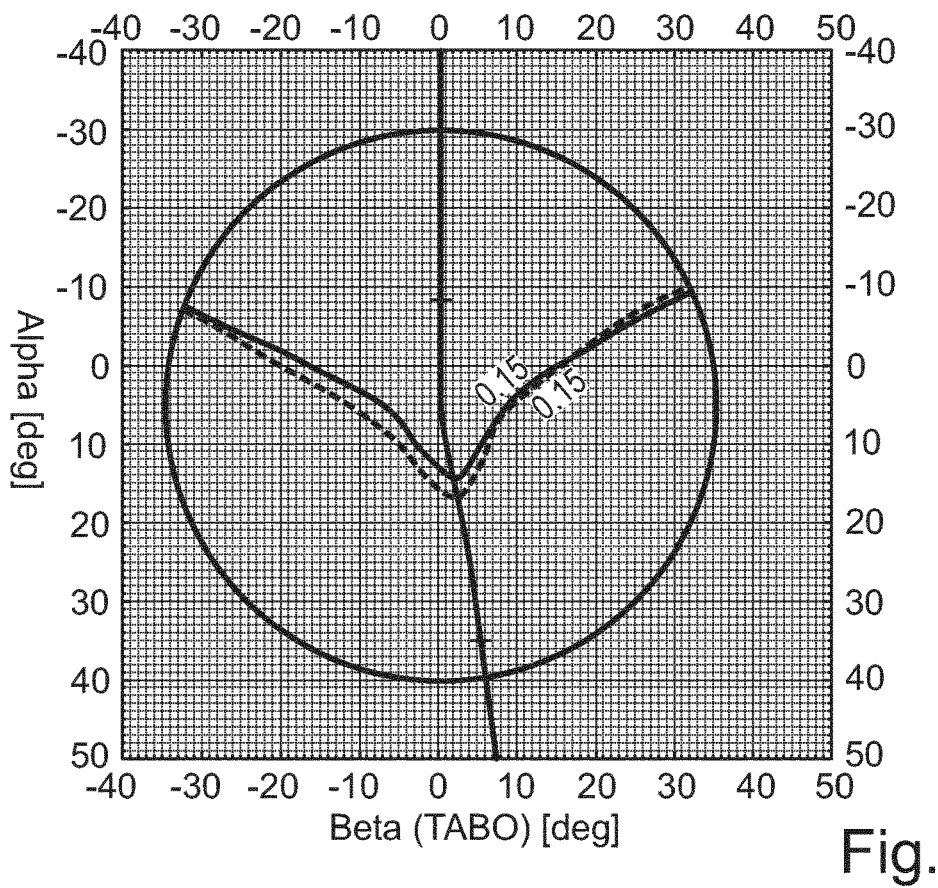

The areas of gaze directions represented on FIG. 11d has been calculated for a vision distance of 2 m.

Figure 11E:
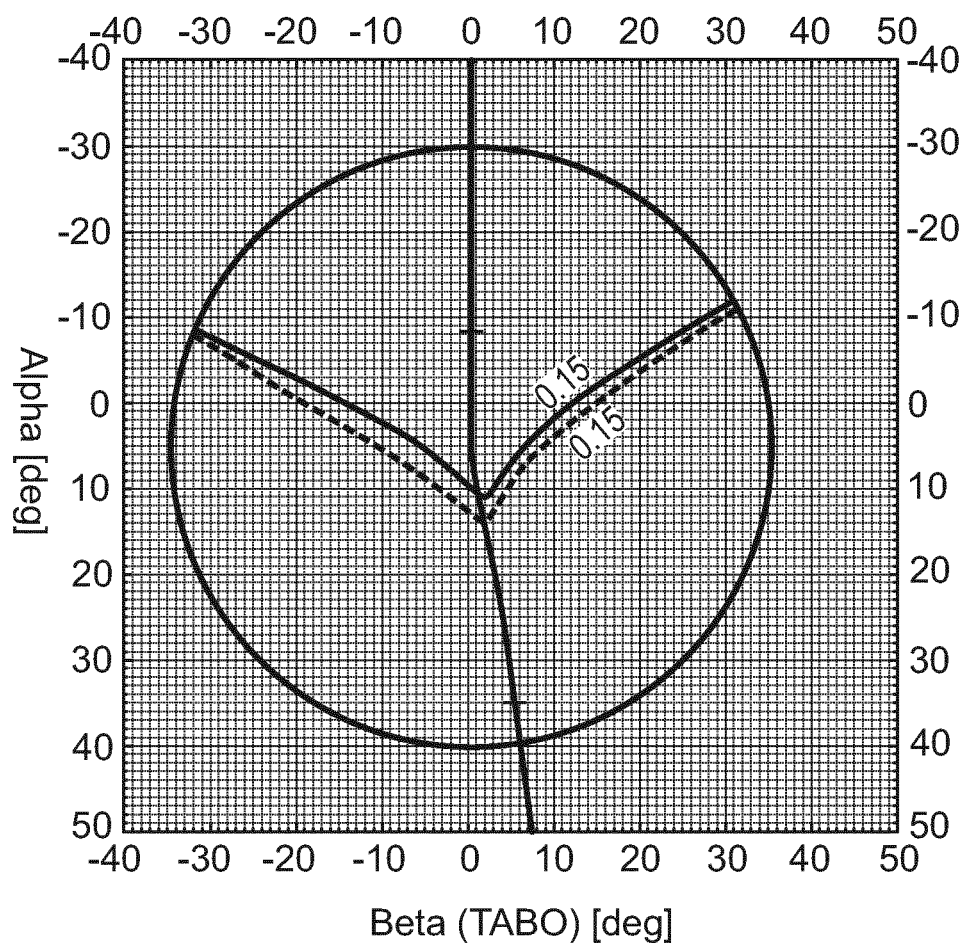

The areas of gaze directions represented on FIG. 11e has been calculated for a vision distance of 5 m.

Figure 12:
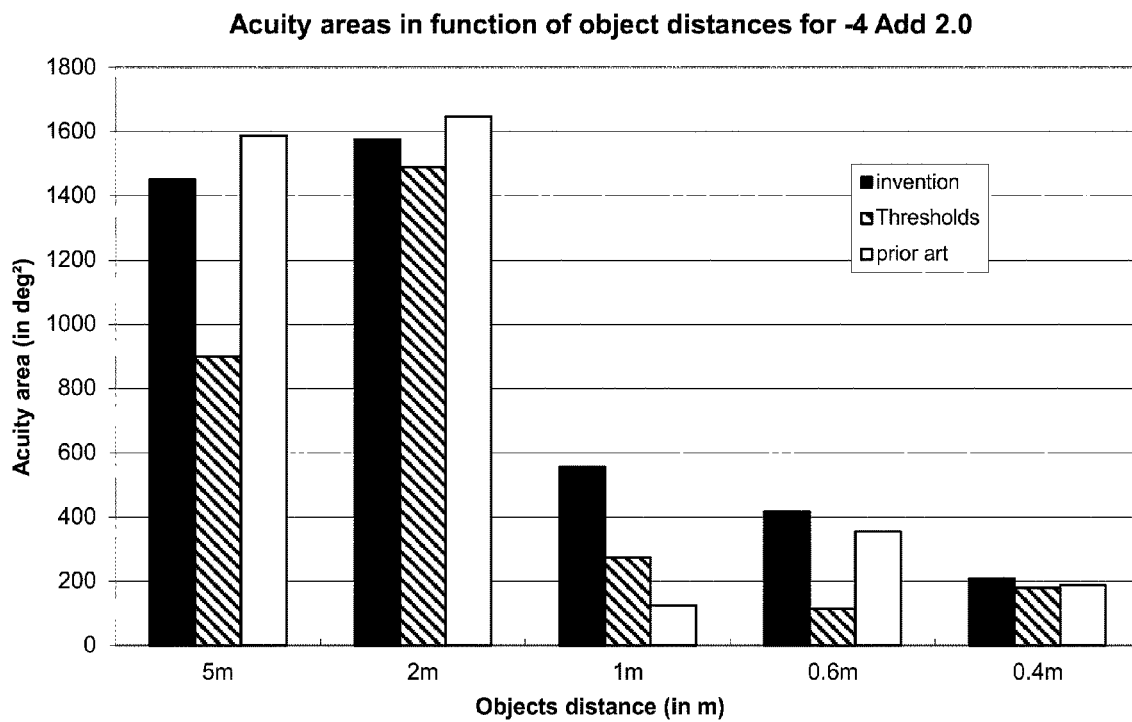
FIG. 12 summarizes the areas of gaze directions of the progressive ophthalmic lens of the invention and of the prior art.

As illustrated on FIG. 12, the progressive ophthalmic lens according to the invention provides an improve intermediate distance vision, in particular the areas of gaze direction for which the acuity loss is below 0.15 LogMAR is much improved compared to the prior art progressive ophthalmic lens.

Furthermore, the progressive ophthalmic lens according to the invention provides a more balanced distribution of acuity between the far vision distance, i.e. greater than or equal to 4 m, intermediate vision distances, i.e. greater than or equal to 0.6 m and smaller than or greater than 2 m and near vision distances, i.e. smaller than or equal to 0.5 m than the prior art progressive ophthalmic lenses.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A progressive ophthalmic lens comprising:
   a lens adapted to a wearer in given wearing conditions having an addition greater than or equal to 1 D and smaller than or equal to 4 D, fulfilling an acuity performance criterion,
   wherein said acuity performance criterion being determined by a processor being configured to:
   define a set of at least three different vision distances including at least a first vision distance greater than or equal to 4 m, a second vision distance equal to 1 m and a third vision distance smaller than or equal to 0.5 m, each vision distance being associated with an acuity loss threshold value and an acuity area threshold value,
   obtain an acuity model defining acuity loss as a function of lens power and resulting astigmatism, and
   determine for each vision distance of the set of at least three vision distances the area of gaze directions within a predefined domain of gaze directions defined as circle of radius 35 deg centered on α=5 deg and β=0 deg for which the acuity loss is below the associated acuity loss threshold value, by using the acuity model,
   wherein
   the acuity performance criterion is fulfilled if for each vision distance of the set of at least three vision distances, the area of gaze directions for which the acuity loss is below the associated acuity loss threshold value is greater than or equal to the acuity area threshold value corresponding to said distance with the acuity area threshold value being:

900 $deg^2$ for the first vision distance,

180 $deg^2$ for the third vision distance, and max(−2440*ADD+5155; 20) $deg^2$ for the second distance vision.

2. The progressive ophthalmic lens according to claim 1, wherein the acuity area threshold value is determined based on the addition of the progressive ophthalmic lens by interpolation between the values:
  a) addition of the progressive addition lens (D) is 1≤ADD≤1.5, acuity area threshold for the first vision distance ($deg^2$) is 1200, acuity area threshold for the second vision distance ($deg^2$) is 1500, and acuity area threshold for third vision distance ($deg^2$) is 210;
  b) the addition of the progressive addition lens (D) is ADD=1.75, the acuity area threshold for the first vision distance ($deg^2$) is 1150, the acuity area threshold for the second vision distance ($deg^2$) is 900, and the acuity area threshold for third vision distance ($deg^2$) is 170;
  c) the addition of the progressive addition lens (D) is ADD=2, the acuity area threshold for the first vision distance ($deg^2$) is 1100, the acuity area threshold for the second vision distance ($deg^2$) is 280, and the acuity area threshold for third vision distance ($deg^2$) is 190;
  d) the addition of the progressive addition lens (D) is ADD=2.25, the acuity area threshold for the first vision distance ($deg^2$) is 1200, the acuity area threshold for the second vision distance ($deg^2$) is 60, and the acuity area threshold for third vision distance ($deg^2$) is 190; or
  e) the addition of the progressive addition lens (D) is 2.5≤ADD≤4, the acuity area threshold for the first vision distance ($deg^2$) is 900, the acuity area threshold for the second vision distance ($deg^2$) is 25, and the acuity area threshold for third vision distance ($deg^2$) is 180.

3. The progressive ophthalmic lens according to claim 1, wherein the lens has an addition greater than or equal to 1.5 D and smaller than or equal to 2.5 D.

4. The progressive ophthalmic lens according to claim 1, wherein the first vision distance corresponds to 5 m.

5. The progressive ophthalmic lens according to claim 1, wherein the third vision distance corresponds to 0.4 m.

6. The progressive ophthalmic lens according to claim 1, wherein the set of at least three vision distances further comprises a vision distance at 2 m and the acuity area threshold value of the said vision distance is defined by interpolation between the values:
  a) addition of the progressive addition lens (D) is 1≤ADD≤1.5 and acuity area threshold for the first vision distance at 2 m ($deg^2$) is 1400;
  b) the addition of the progressive addition lens (D) is ADD=1.75 and the acuity area threshold for the first vision distance at 2 m ($deg^2$) is 1570;
  c) the addition of the progressive addition lens (D) is ADD=2 and the acuity area threshold for the first vision distance at 2 m ($deg^2$) is 1490;
  d) the addition of the progressive addition lens (D) is ADD=2.25 and the acuity area threshold for the first vision distance at 2 m ($deg^2$) is 1100; and
  e) the addition of the progressive addition lens (D) is 2.5≤ADD≤4 and the acuity area threshold for the first vision distance at 2 m ($deg^2$) is 205.

7. The progressive ophthalmic lens according to claim 1, wherein the set of at least three vision distances further comprises a vision distance at 60 cm and the acuity area threshold of the said vision distance being defined by interpolation between the values:
  a) addition of the progressive addition lens (D) is 1≤ADD≤1.5 and acuity area threshold for the first vision distance at 60 cm ($deg^2$) is 480;
  b) the addition of the progressive addition lens (D) is ADD=1.75 and the acuity area threshold for the first vision distance at 60 cm ($deg^2$) is 400;
  c) the addition of the progressive addition lens (D) is ADD=2 and the acuity area threshold for the first vision distance at 60 cm (deg) is 115;
  d) the addition of the progressive addition lens (D) is ADD=2.25 and the acuity area threshold for the first vision distance at 60 cm ($deg^2$) is 65; and
  e) the addition of the progressive addition lens (D) is 2.5≤ADD≤4 and the acuity area threshold for the first vision distance at 60 cm ($deg^2$) is 25.

8. A method implemented by a computer for determining if a progressive ophthalmic lens fulfills an acuity criterion, said progressive ophthalmic lens being delimited by a contour, adapted for a wearer with a given prescription and given wearing conditions and having an addition greater than or equal to 1D and smaller than or equal to 4D, the method comprising:
  defining a set of at least three different vision distances comprising at least a first vision distance greater than or equal to 4 m, a second vision distance equal to 1 m and a third vision distance smaller than or equal to 0.5 m, each vision distance being associated with an acuity loss threshold value and an acuity area threshold value;
  obtaining an acuity model defining acuity loss as a function of lens power and resulting astigmatism;
  determining of each vision distance using the acuity model the area of gaze directions within a predefined domain of gaze directions defined as circle of radius 35 deg centered on α=5 deg and β=0 deg for which the acuity loss is below the associated acuity loss threshold value; and
  determining if the acuity criterion is fulfilled by determining if for each vision distance of the set of a least three vision distances the determined area of gaze directions for which the acuity loss is below the associated acuity loss threshold value is greater than or equal to the associated acuity area threshold value corresponding to said distance with the acuity area threshold value being:
    900 $deg^2$ for the first distance,
    180 $deg^2$ for the third vision distance, and
    max(−2440*ADD+5155; 20) $deg^2$ for the second distance vision.

9. The method according to claim 8, wherein the acuity area threshold value is defined based on the addition of the progressive ophthalmic lens by interpolation between the values:
  a) addition of the progressive addition lens (D) is 1≤ADD≤1.5, acuity area threshold for the first vision distance ($deg^2$) is 1200, acuity area threshold for the second vision distance ($deg^2$) is 1500, and acuity area threshold for third vision distance ($deg^2$) is 210;
  b) the addition of the progressive addition lens (D) is ADD=1.75, the acuity area threshold for the first vision distance ($deg^2$) is 1150, the acuity area threshold for the second vision distance ($deg^2$) is 900, and the acuity area threshold for third vision distance ($deg^2$) is 170;

c) the addition of the progressive addition lens (D) is ADD=2, the acuity area threshold for the first vision distance (deg$^2$) is 1100, the acuity area threshold for the second vision distance (deg$^2$) is 280, and the acuity area threshold for third vision distance (deg$^2$) is 190;

d) the addition of the progressive addition lens (D) is ADD=2.25, the acuity area threshold for the first vision distance (deg$^2$) is 1200, the acuity area threshold for the second vision distance (deg$^2$) is 60, and the acuity area threshold for third vision distance (deg$^2$) is 190; or e) the addition of the progressive addition lens (D) is 2.5≤ADD≤4, the acuity area threshold for the first vision distance (deg$^2$) is 900, the acuity area threshold for the second vision distance (deg$^2$) is 25, and the acuity area threshold for third vision distance (deg$^2$) is 180.

10. The progressive ophthalmic lens according to claim 8, wherein the lens has an addition greater than or equal to 1.5 D and smaller than or equal to 2.5 D.

11. The method according to claim 8, wherein the set of at least three vision distances further comprises a vision distance at 2 m and the acuity area threshold value of the said vision distance is defined by interpolation between the values:

a) addition of the progressive addition lens (D) is 1≤ADD≤1.5 and acuity area threshold for the first vision distance at 2 m (deg$^2$) is 1400;

b) the addition of the progressive addition lens (D) is ADD=1.75 and the acuity area threshold for the first vision distance at 2 m (deg$^2$) is 1570;

c) the addition of the progressive addition lens (D) is ADD=2 and the acuity area threshold for the first vision distance at 2 m (deg$^2$) is 1490;

d) the addition of the progressive addition lens (D) is ADD=2.25 and the acuity area threshold for the first vision distance at 2 m (deg$^2$) is 1100; and e) the addition of the progressive addition lens (D) is 2.5≤ADD≤4 and the acuity area threshold for the first vision distance at 2 m (deg$^2$) is 205.

12. The method according to claim 8, wherein the set of at least three vision distances further comprises a vision distance at 60 cm and the acuity area threshold of the said vision distance being defined by interpolation between the values:

a) addition of the progressive addition lens (D) is 1≤ADD≤1.5 and acuity area threshold for the first vision distance at 60 cm (deg$^2$) is 480;

b) the addition of the progressive addition lens (D) is ADD=1.75 and the acuity area threshold for the first vision distance at 60 cm (deg$^2$) is 400;

c) the addition of the progressive addition lens (D) is ADD=2 and the acuity area threshold for the first vision distance at 60 cm (deg$^2$) is 115;

d) the addition of the progressive addition lens (D) is ADD=2.25 and the acuity area threshold for the first vision distance at 60 cm (deg$^2$) is 65; and e) the addition of the progressive addition lens (D) is 2.5≤ADD≤4 and the acuity area threshold for the first vision distance at 60 cm (deg$^2$) is 25.

13. A method implemented by a computer of determining a progressive ophthalmic lens delimited by a contour, adapted for a wearer with a given prescription and given wearing conditions, said method comprising:

determining if the determined progressive ophthalmic lens fulfills an acuity criterion according to the method of claim 8.

14. A non-transitory computer program product comprising one or more stored sequence of instruction that is accessible to a processor and which, when executed by the processor, causes the processor to carry out the method of claim 8.

* * * * *